US007789341B2

(12) United States Patent
Arlton et al.

(10) Patent No.: US 7,789,341 B2
(45) Date of Patent: Sep. 7, 2010

(54) ROTARY WING AIRCRAFT HAVING A NON-ROTATING STRUCTURAL BACKBONE AND A ROTOR BLADE PITCH CONTROLLER

(76) Inventors: Paul E. Arlton, 3279 Secretariat Cir., West Lafayette, IN (US) 47906; David J. Arlton, 3279 Secretariat Cir., West Lafayette, IN (US) 47906

(*) Notice: Subject to any disclaimer, the term of this patent is extended or adjusted under 35 U.S.C. 154(b) by 1119 days.

(21) Appl. No.: 11/105,746

(22) Filed: Apr. 14, 2005

(65) Prior Publication Data

US 2006/0011777 A1 Jan. 19, 2006

Related U.S. Application Data

(60) Provisional application No. 60/562,081, filed on Apr. 14, 2004.

(51) Int. Cl.
*B64C 27/08* (2006.01)
(52) U.S. Cl. .................. 244/17.23; 244/7 B; 244/6; 244/7 A
(58) Field of Classification Search ............. 244/17.23, 244/17.25, 190, 17.11, 17.19, 17.21, 55, 244/67, 69, 12.3, 13, 6, 7 A, 7 B, 137.3, 14, 244/63, 3.28, 3.29; 89/1.808; 446/36, 37; 416/124, 125, 127, 129, 130
See application file for complete search history.

(56) References Cited

U.S. PATENT DOCUMENTS 1,769,203 A * 7/1930 Buckley .................... 244/14
2,406,625 A * 8/1946 Oglesby .................... 244/13
2,486,059 A 10/1949 Pentecost
3,149,803 A 9/1964 Petrides et al.
3,570,787 A * 3/1971 Stahmer ................. 244/17.23
3,612,444 A 10/1971 Girard
3,643,599 A 2/1972 Hubich
3,722,830 A * 3/1973 Barber ................... 244/17.23
4,080,922 A 3/1978 Brubaker
4,267,987 A 5/1981 McDonnell
4,478,379 A 10/1984 Kerr
5,015,187 A 5/1991 Lord
5,058,824 A * 10/1991 Cycon et al. ............. 244/17.13
5,497,960 A 3/1996 Previnaire
6,179,247 B1 1/2001 Milde
6,347,764 B1 2/2002 Brandon et al.
6,402,031 B1 6/2002 Hall

FOREIGN PATENT DOCUMENTS

FR 2 735 200 12/1996
JP 2002-316699 10/2002

OTHER PUBLICATIONS

Predator Unmanned Aerial Vehicle (UAV), USA., www.airforce-technology.com/projects/predator, printed Dec. 16, 2002.
International Search Report and Written Opinion for PCT/US05/12560, dated Jun. 25, 2008.

* cited by examiner

*Primary Examiner*—Michael R Mansen
*Assistant Examiner*—Joshua J Michener
(74) *Attorney, Agent, or Firm*—Barnes & Thornburg LLP

(57) ABSTRACT

A rotary wing vehicle includes a body structure having an elongated tubular backbone or core, and a counter-rotating coaxial rotor system having rotors with each rotor having a separate motor to drive the rotors about a common rotor axis of rotation. The rotor system is used to move the rotary wing vehicle in directional flight.

11 Claims, 28 Drawing Sheets

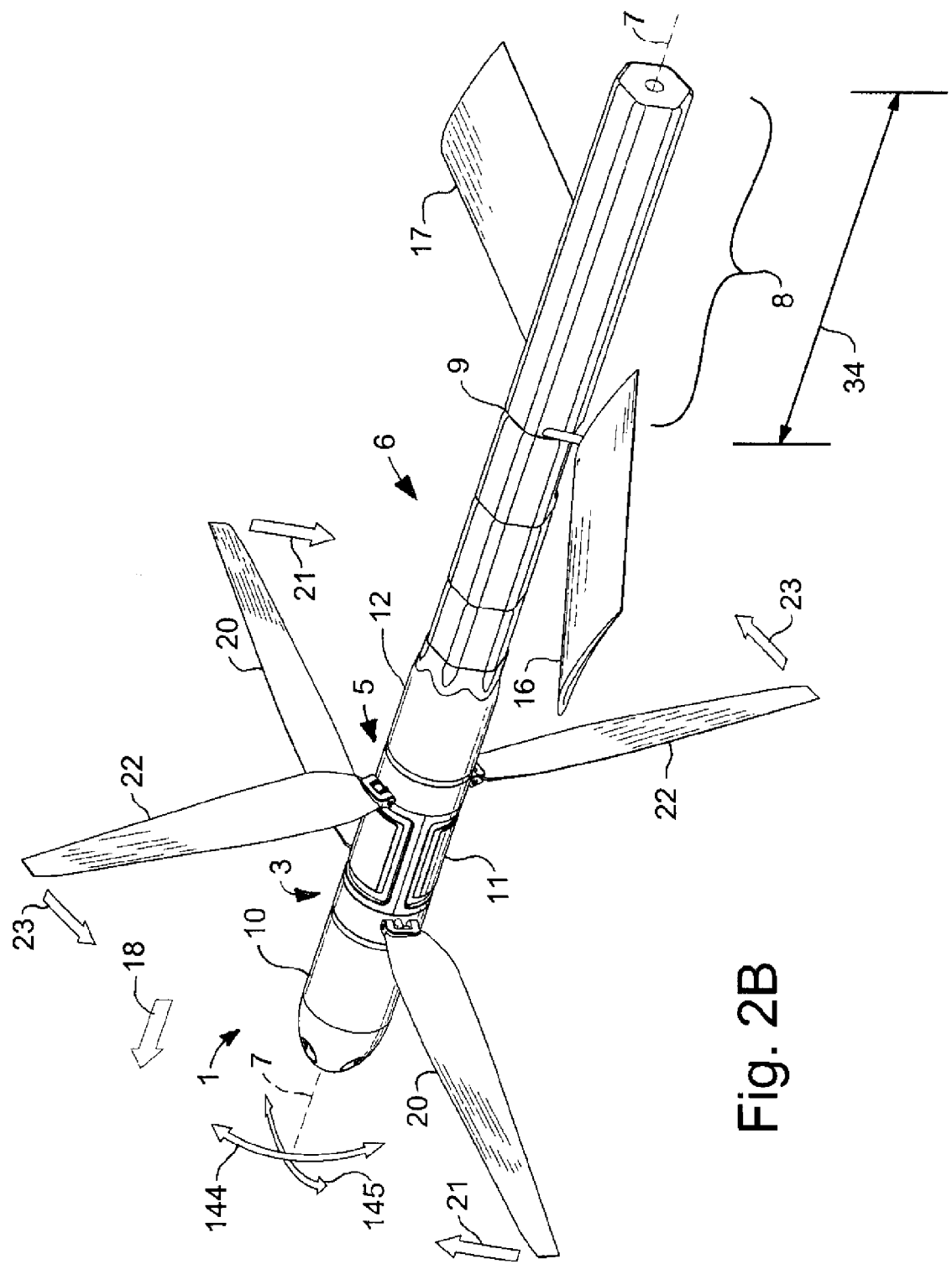

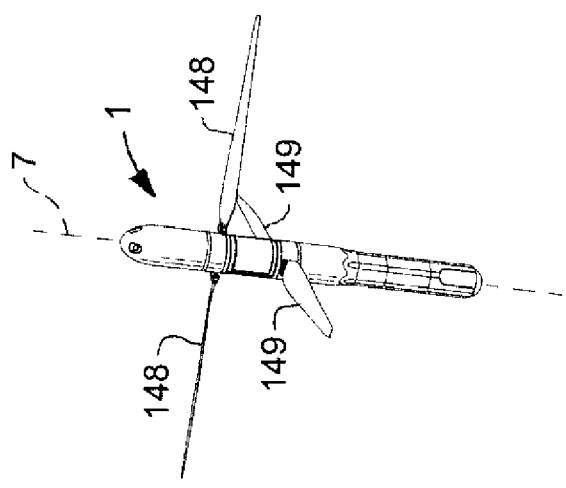
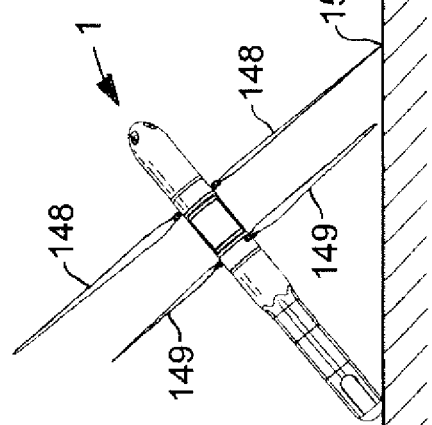
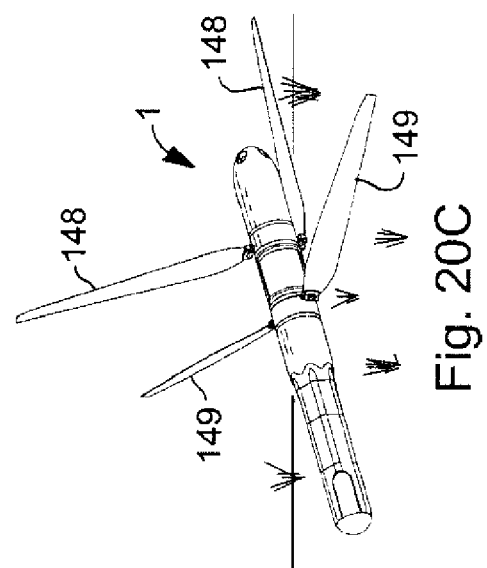
Fig. 20A
Fig. 20B
Fig. 20C

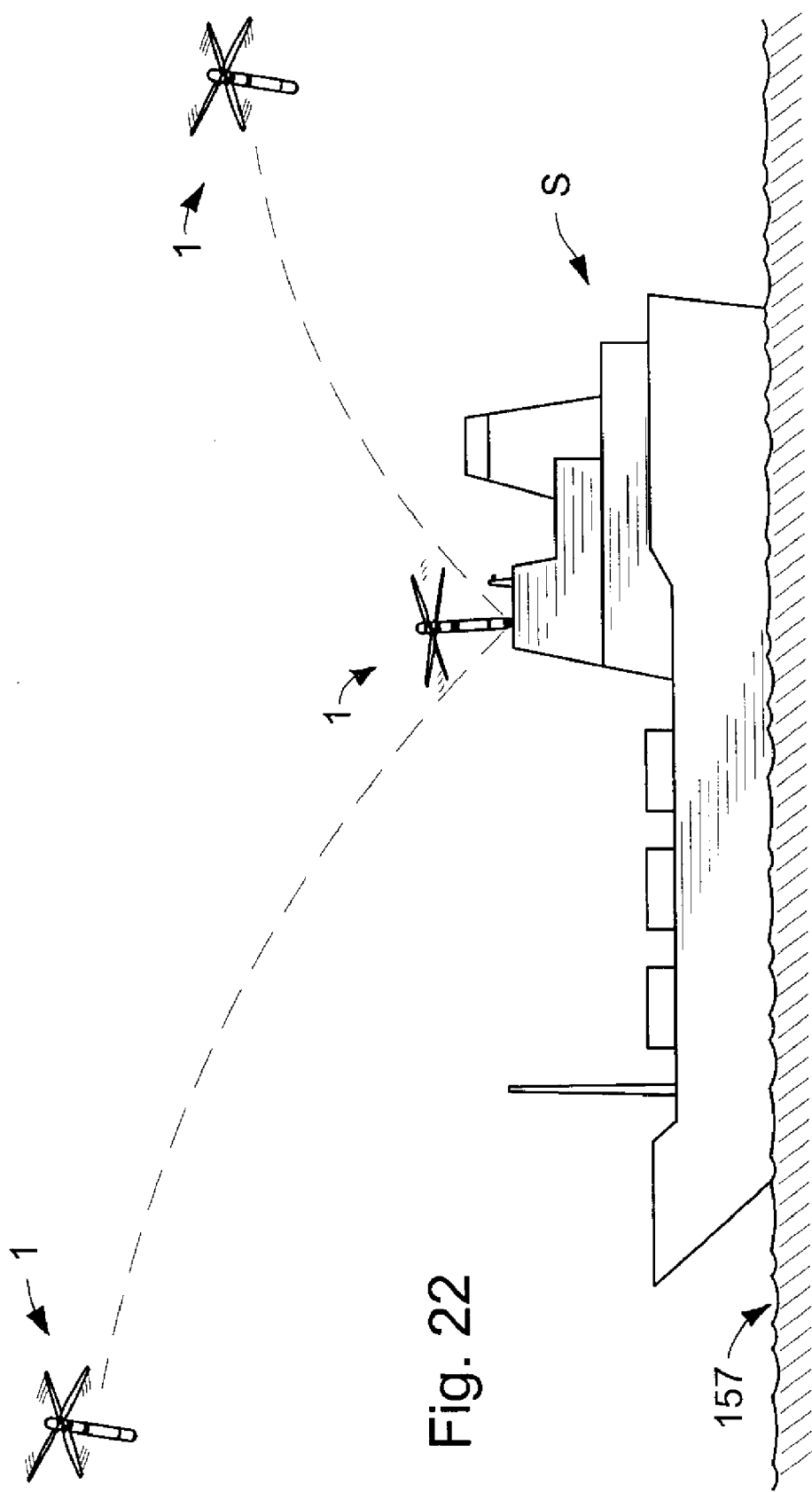

ROTARY WING AIRCRAFT HAVING A NON-ROTATING STRUCTURAL BACKBONE AND A ROTOR BLADE PITCH CONTROLLER

This application claims priority to U.S. Provisional Application No. 60/562,081 which was filed Apr. 14, 2004 and is hereby incorporated by reference herein.

BACKGROUND

The present disclosure relates to aerial vehicles and particularly to unmanned aerial vehicles (UAV). More particularly, the present disclosure relates to unmanned rotary wing vehicles.

Rotary wing vehicles are used in a variety of applications. Unmanned rotary wing vehicles are often used by the military, law enforcement agencies, and commercial activities for aerial reconnaissance operations.

SUMMARY

A rotary wing vehicle, in accordance with the present disclosure includes a body structure having an elongated tubular backbone or core, and a counter-rotating coaxial rotor system having rotors with each rotor having a separate motor to drive the rotors about a common rotor axis of rotation. A power source comprising, for example, a battery, fuel cell, or hybrid gas-electric generator is provided to supply electric power to the motors. Power transmission to and between the rotor systems is accomplished primarily by means of electrical wiring instead of mechanical shafting. A modular structure is described which assists manufacturability.

One embodiment of the disclosure includes an auxiliary power-pack which is separable from the vehicle in flight to facilitate, for instance, delivery of the vehicle to a distant location. In another embodiment, the power-pack comprises a payload such as an explosive munition, dipping sonar, hydrophones, or a separable sonobouy module. While aspects of the disclosure are applicable to many helicopters, including full-sized man carrying helicopters, the current disclosure is especially well suited for application to small, autonomous, or radio-controlled rotary wing aircraft known as remotely piloted vehicles (RPVs), or unmanned aerial vehicles (UAVs).

Additional features of the present disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The detailed description particularly refers to the accompanying figures in which:

FIG. 2B is a perspective view of the rotary wing vehicle of FIG. 2A having a counter-rotating coaxial rotor system and a fixed-wing booster module in a horizontal flight mode;

FIGS. 20A, 20B, and 20C are sequential views of the rotary wing vehicle showing the operation of unequal length folding blades during a crash landing of the vehicle on ground underlying the rotary wing vehicle;

FIG. 22 is a perspective view of a rotary wing vehicle in accordance with present disclosure delivering a sensor or marking to a remote location shown for the purpose of illustration to be a ship on the open ocean;

DETAILED DESCRIPTION

Figure 1:
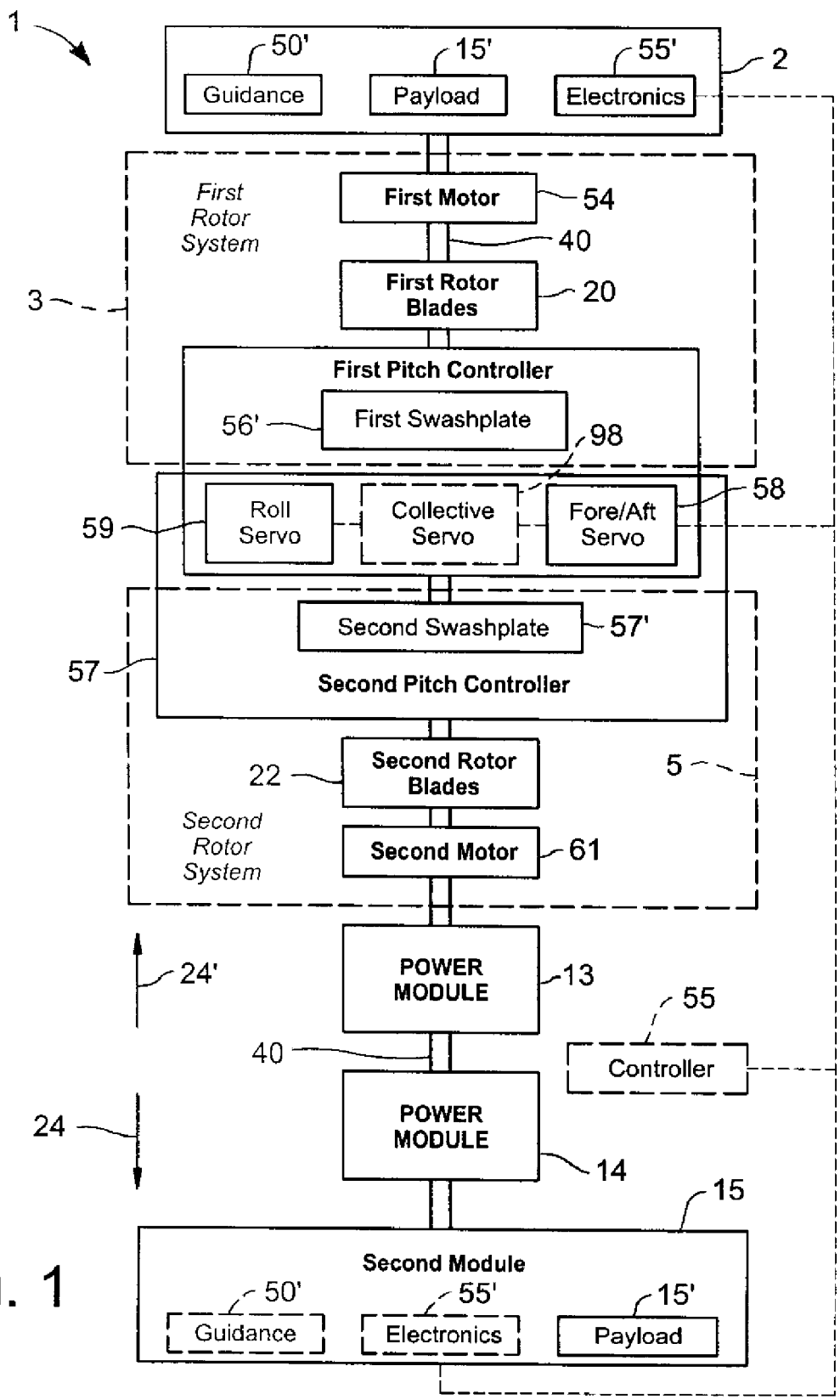
FIG. 1 is a diagrammatic view of a rotary wing vehicle in accordance with the present disclosure showing an aircraft including a guidance system, and a pair of rotor systems coupled to an airframe comprising a non-rotating structural spine or backbone and carrying a payload.

As suggested diagramatically in FIG. 1, a rotary wing vehicle 1 includes, in series, a first module 2, a first and a second rotor system 3 and 5, power modules 13 and 14, and a second module 15 coupled in spaced-apart relation to an airframe 40 extending along a common axis 7. Illustratively, airframe 40 is an elongated central backbone and can be arranged as a hollow core or having a cruciform cross-section. In operation, first rotor 3 and second rotor 5 rotate in opposite directions about common axis 7 to direct thrust in direction 24 and create lift in direction 24' to cause controlled flight of rotary wing vehicle 1, as suggested in FIG. 2A. First module 2 is adapted to include a variety of guidance systems 50', electronics 55, or payloads 15'. Second module 15 is adapted to include payload 15', or in some embodiments, a variety of guidance systems 50' and electronics systems 55'. Payload 15' may include, but is not limited to, munitions, radiation sensors, chemical detection sensors, biological agent sensors, active and passive listening devices, video sensors, supplemental power sources, or other mission-specific equipment. Rotary wing vehicle 1 thus provides means for moving reconnaissance, observation, or survey monitoring equipment to an area of interest to obtain information therefrom.

Figure 5:
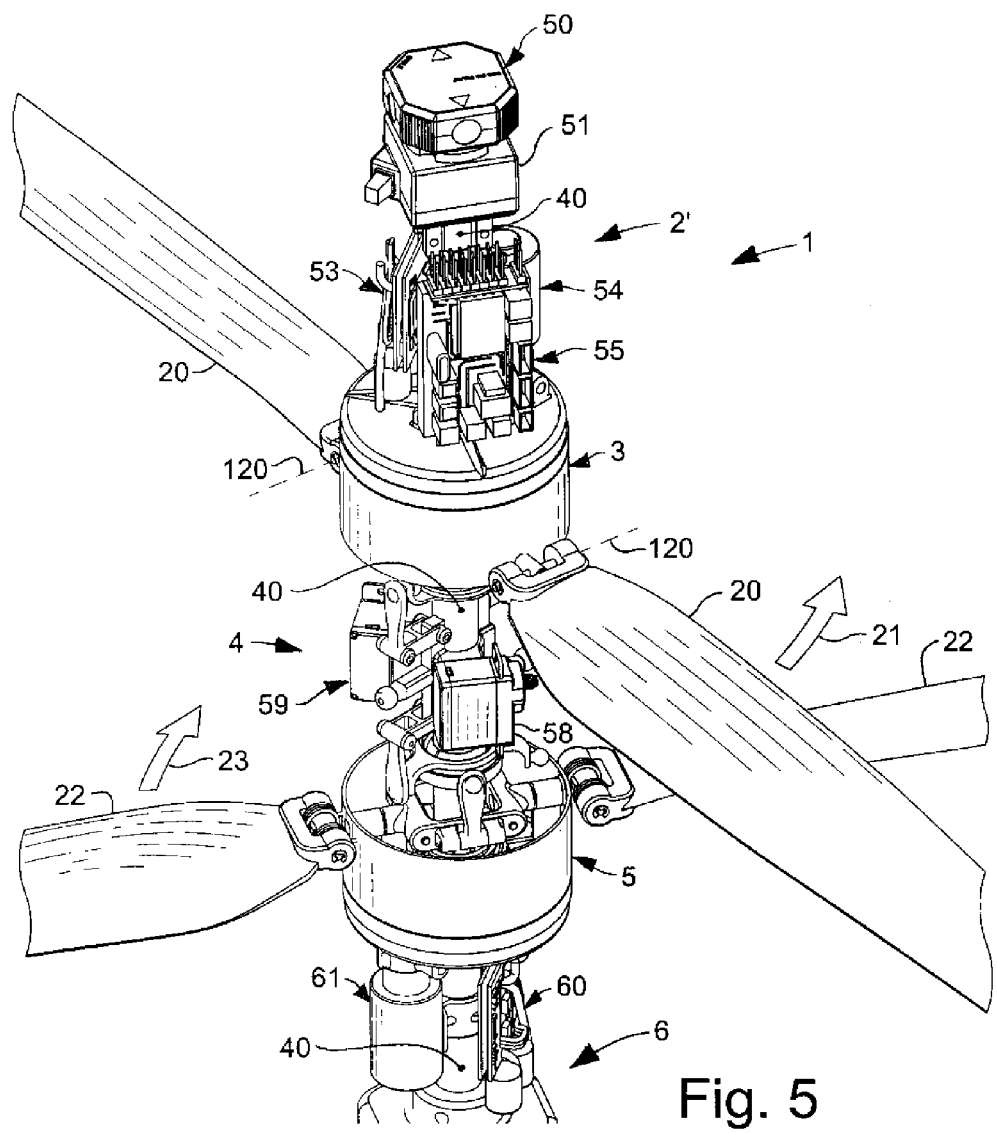
FIG. 5 is an enlarged perspective view of the vehicle of FIG. 2A, with portions broken away, showing an upper interior section of the vehicle and the counter-rotating coaxial rotor system.
Figure 6:
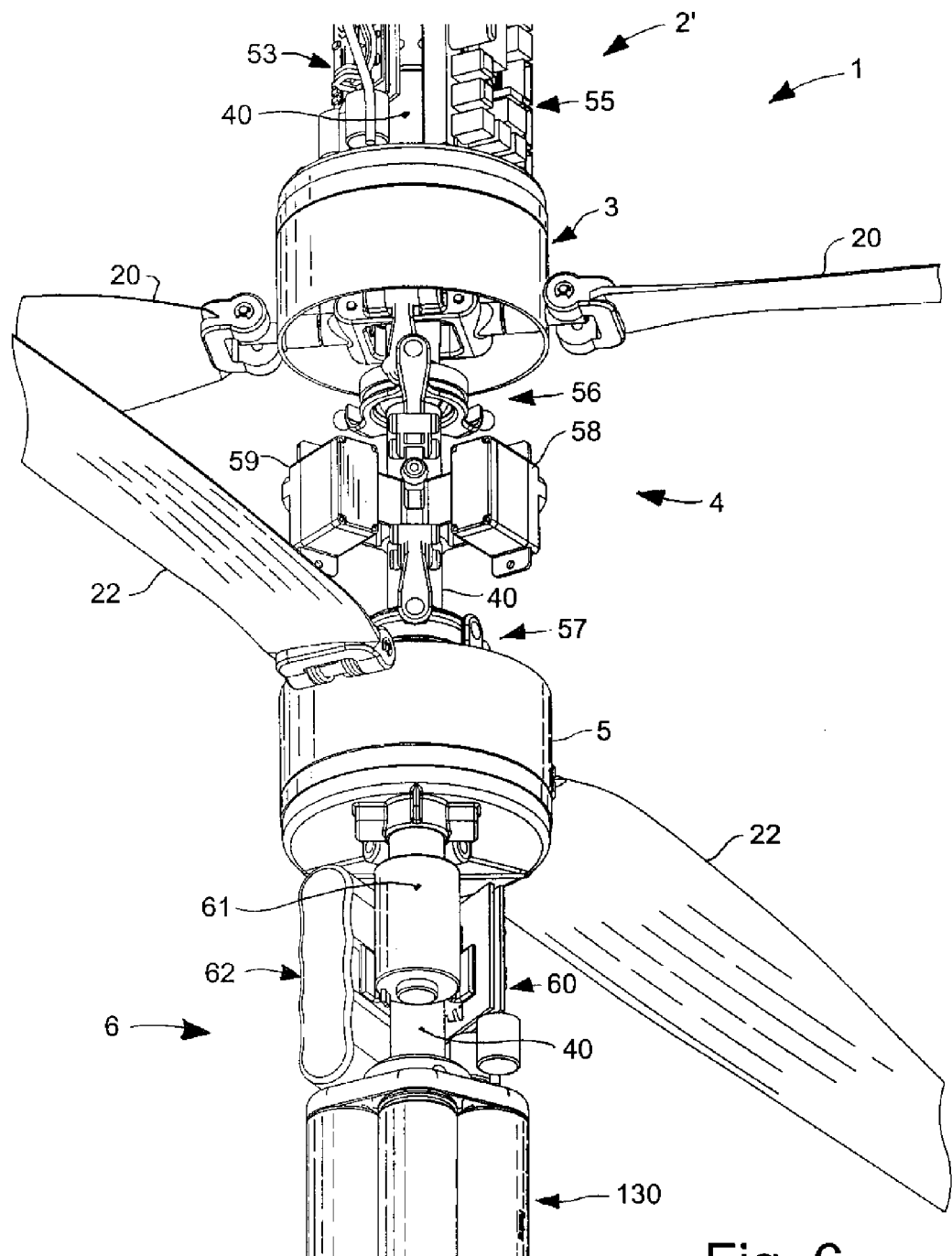
FIG. 6 is an enlarged perspective view of the vehicle of FIG. 2A, with portions broken away, showing a lower interior section of the vehicle and the counter-rotating coaxial rotor system.
Figure 25A:
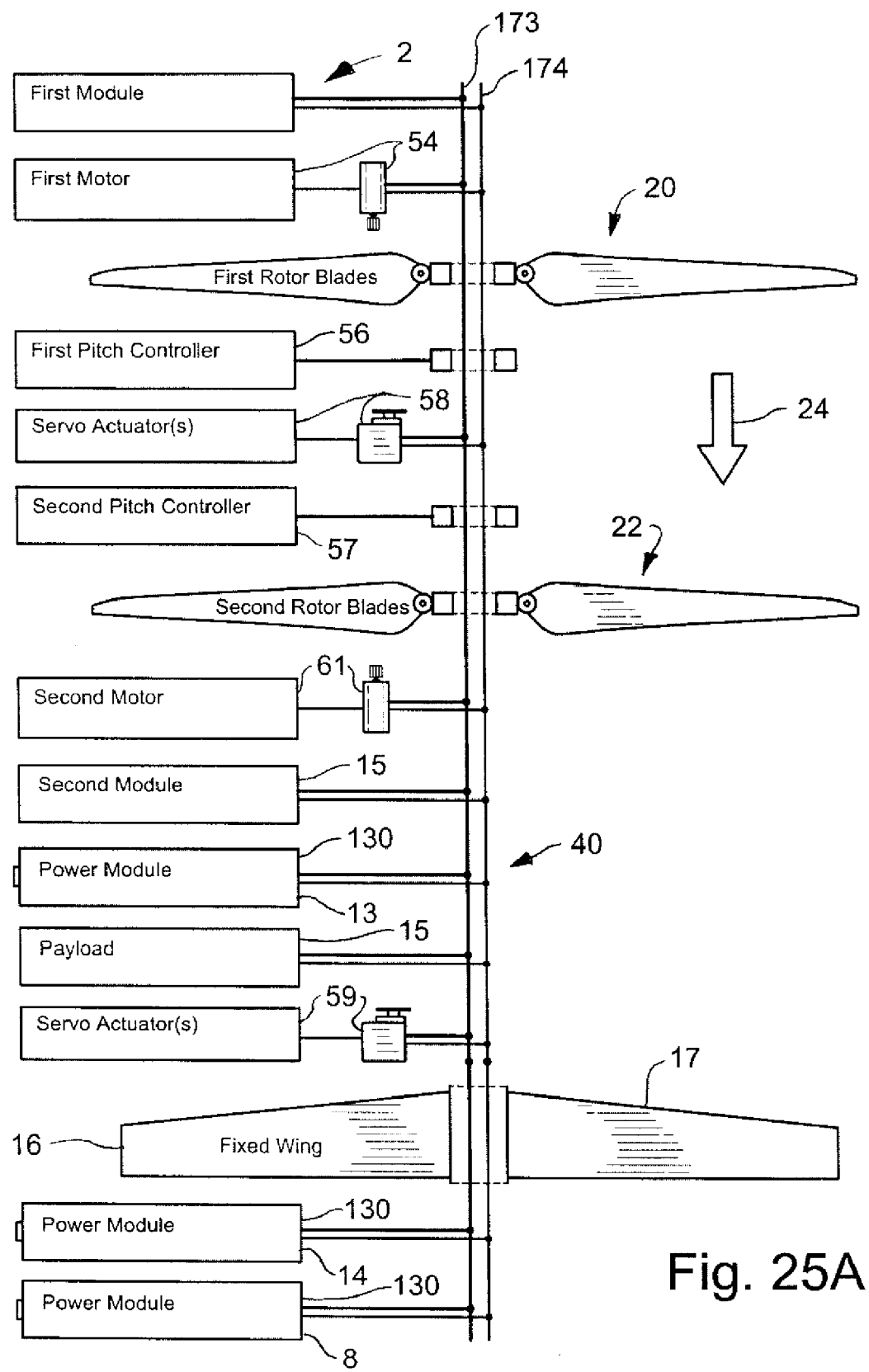
FIG. 25A is a diagrammatic view of another rotary wing vehicle showing an aircraft having a central buss architecture with power and signal conduits, a guidance system, and a pair of rotor systems coupled to an airframe comprising a non-rotating structural spine or backbone and carrying a payload.
Figure 25B:
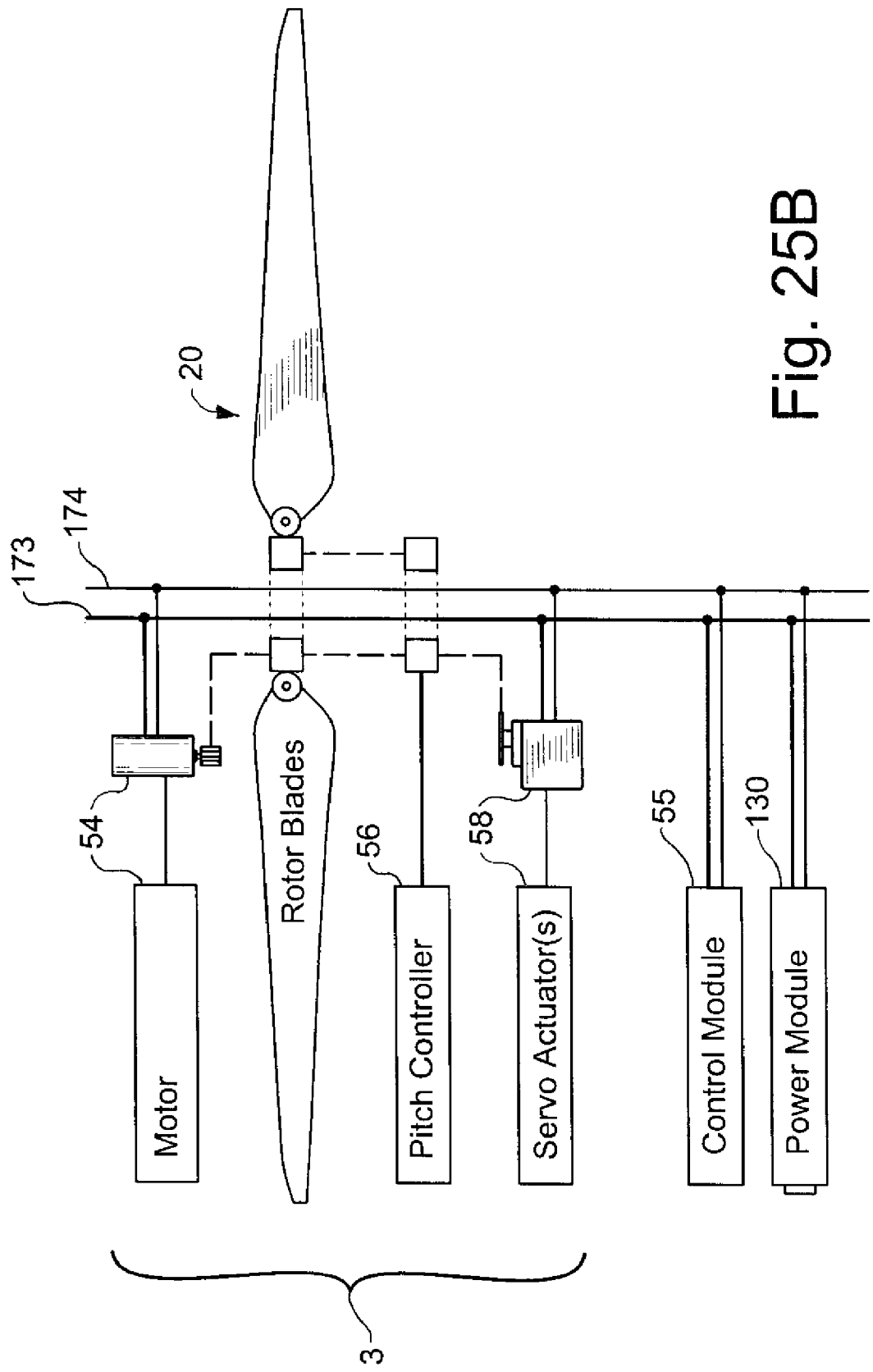
FIG. 25B is a diagrammatic view of the rotary wing vehicle of FIG. 25A showing a rotor system, control system, and power supply communicating through a central data/power buss with power and signal conduit.

As suggested in FIGS. 1, 25A and 25B, first rotor system 3 includes a first motor 54, first rotor blades 20, and a first pitch controller 56. In illustrative embodiments, motor 54 is an electric motor as shown, for example, in FIGS. 4-6, or other suitable means for providing power to rotate rotor blades 20 about common axis 7. First rotor system 3 and second rotor system 5 are similar to one another in structure and function. Second rotor system 5 includes a second motor 61, second rotor blades 22, and a second pitch controller 57. In illustrative embodiments, motor 61 is an electric motor as shown, for example, in FIGS. 4-6, or other suitable means for providing power to rotate rotor blades 22 about common axis 7. Illustratively, electrical and electronic components are connected and communicate through electrical conduit 173 and electronic conduit 174 which hold power and signal lines, respectively. Although rotary wing vehicle 1 is illustrated having two rotor systems, rotary wing vehicle 1 may have more than two rotor systems as performance and mission demands dictate.

Figure 3:
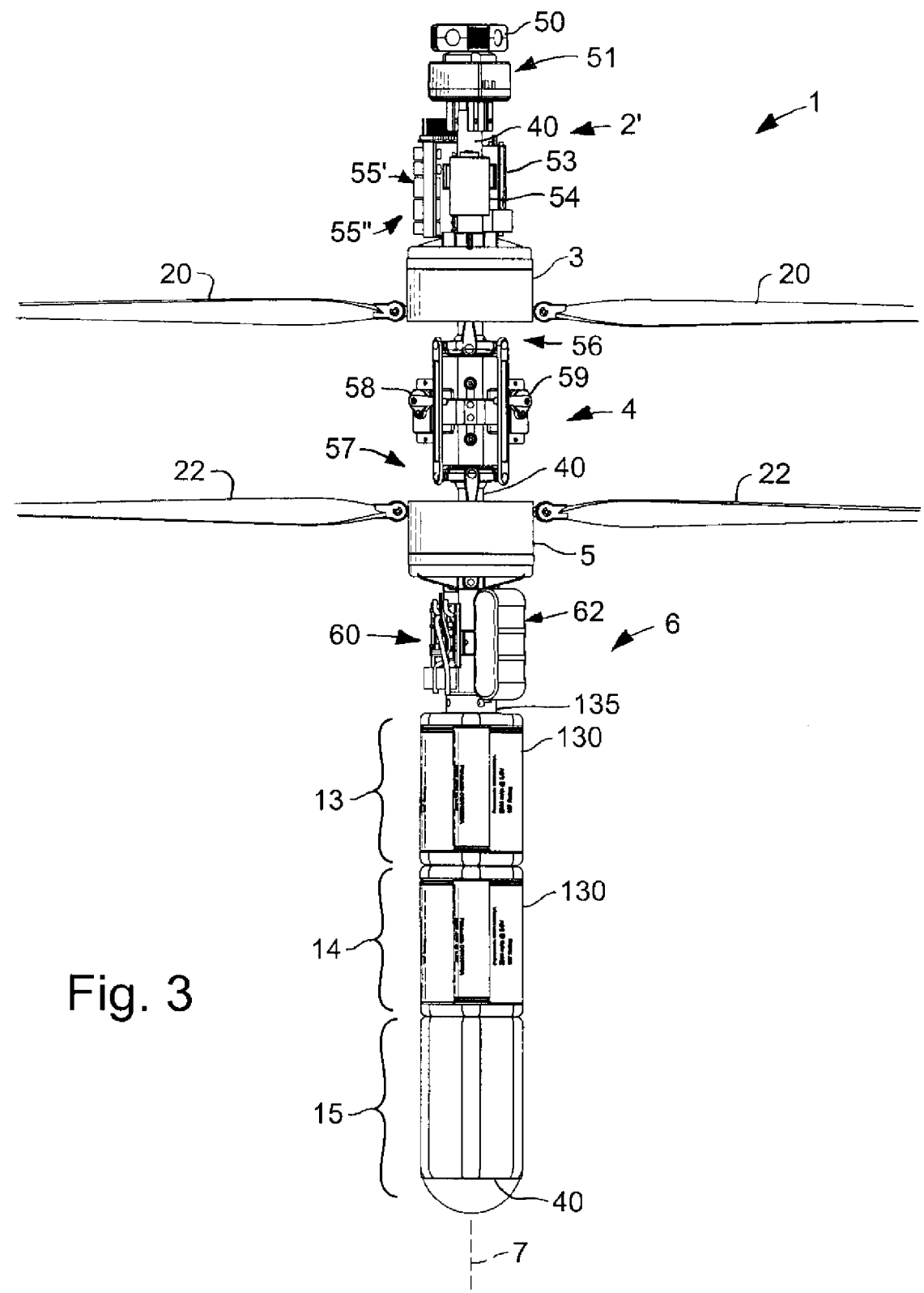
FIG. 3 is a side elevation view of the rotary wing vehicle of FIG. 2A showing exterior body panels, electrical wiring, and booster section removed for clarity.

As shown in FIGS. 1 and 3, airframe 40 is non-rotating and forms a central elongated hollow backbone to receive first module 2, first and second rotor systems 3, 5, power modules 13 and 14, and second module 15. Illustratively, power modules 13 and 14 are positioned to lie in side-by-side relation to one another between second rotor system 5 and second module 15. Because airframe 40 is hollow power modules 13, 14 can be connected electrically through the hollow backbone to motors 54 and 61.

Illustratively, pitch controller 56 is a swashplate 56' coupled to a fore/aft servo 58 and a roll servo 59 to vary the cyclic pitch of rotor blades 20 in response to input from a controller 55. In some embodiments, swashplate 56' is further coupled to a collective servo 98 to collectively change the pitch of rotor blades 20. Likewise, pitch controller 57 is a swashplate 57' coupled to a fore/aft servo 58 and a roll servo 59 to vary the cyclic pitch of rotor blades 20 in response to input from a controller 55. In some embodiments, swashplate 57' is also coupled to a collective servo 98 to collectively vary the pitch of rotor blades 20. In illustrative embodiments, controller 55 is a command signal controller as shown, for example, in FIG. 3, or other suitable means for providing a desired electrical or mechanical directional signal to servos 58, 59, or 98, and motors 54, 61.

Illustratively, rotary wing vehicle 1 has a fixed-pitch rotor system having two servos 58, 59 for aircraft pitch (helicopter-style fore/aft cyclic input) or aircraft roll (helicopter-style right/left cyclic input) control. Servo 98, shown in phantom in FIG. 1, can be mounted similarly to servos 58, 59 if collective pitch control is desired. In embodiments having a fixed-pitch rotor system, rotor systems 3,5 are connected to swashplates 56', 57' by pitch links 119. Servos 58, 59 are connected to swashplates 56', 57' by links 125, 126. A feature of the present disclosure is that rotary wing vehicle 1 can be flown with as few as one or two cyclic servo actuators (servo 58, 59). In a "one-servo" flight mode, differential torque of motors 54, 61 controls yaw orientation, and servo 58 controls forward and backward flight. With only one cyclic servo, vehicle 1 can be flown much like an airplane having only rudder and elevator control. In the illustrative "two-servo" flight mode, servos 58, 59 provide fore/aft aircraft pitch and right/left aircraft roll control with differential torque of motors 54, 61 providing yaw control.

In operation, rotor hubs 101 rotate in opposite directions. Servos 58, 59 are controlled by onboard flight control electronics to tilt simultaneously swashplate 56' and swashplate 57' which then cyclically vary the blade pitch angle of rotating rotor blades 20 to tilt vehicle 1 in one of aircraft pitch direction 170 and aircraft roll direction 171. In another embodiment having collective pitch (see FIG. 11B), collective servo 98 and a third pitch link (not shown) are provided to vary the axial location of swashplates 56', 57' along common axis 7 and to vary the collective pitch of rotor blades 20, 22 using electronic Collective-Cyclic Pitch Mixing (CCPM). With collective-cyclic pitch mixing servos 58, 59, and 98 tilt swashplates 56' and 57' in unison to vary cyclic pitch and move swashplates 56', 57' axially in unison along common axis 7 to vary collective pitch.

The illustrative embodiment employs differential motor speed for yaw (heading) control while in a vertical flight configuration. Normally, coaxial helicopters use variable blade pitch and differential blade angle to control yaw motions in flight. In the present disclosure, differential torque generated by operating motors 54, 61 at different speeds relative to the fixed body of vehicle 1 generates yaw forces to stabilize and control yaw motion (i.e. rotation about common axis 7). In this method, the torque (and eventually the speed) of motor 54 is increased or decreased in response to a yaw motion of rotary wing vehicle 1 about vertical common axis 7.

The torque (speed) of second motor 61 is adjusted automatically by an onboard computer system, contained within controller 55, in opposition to the torque (speed) of first motor 54 to maintain constant lift so that rotary wing vehicle 1 neither gains nor loses altitude.

Figure 11A:
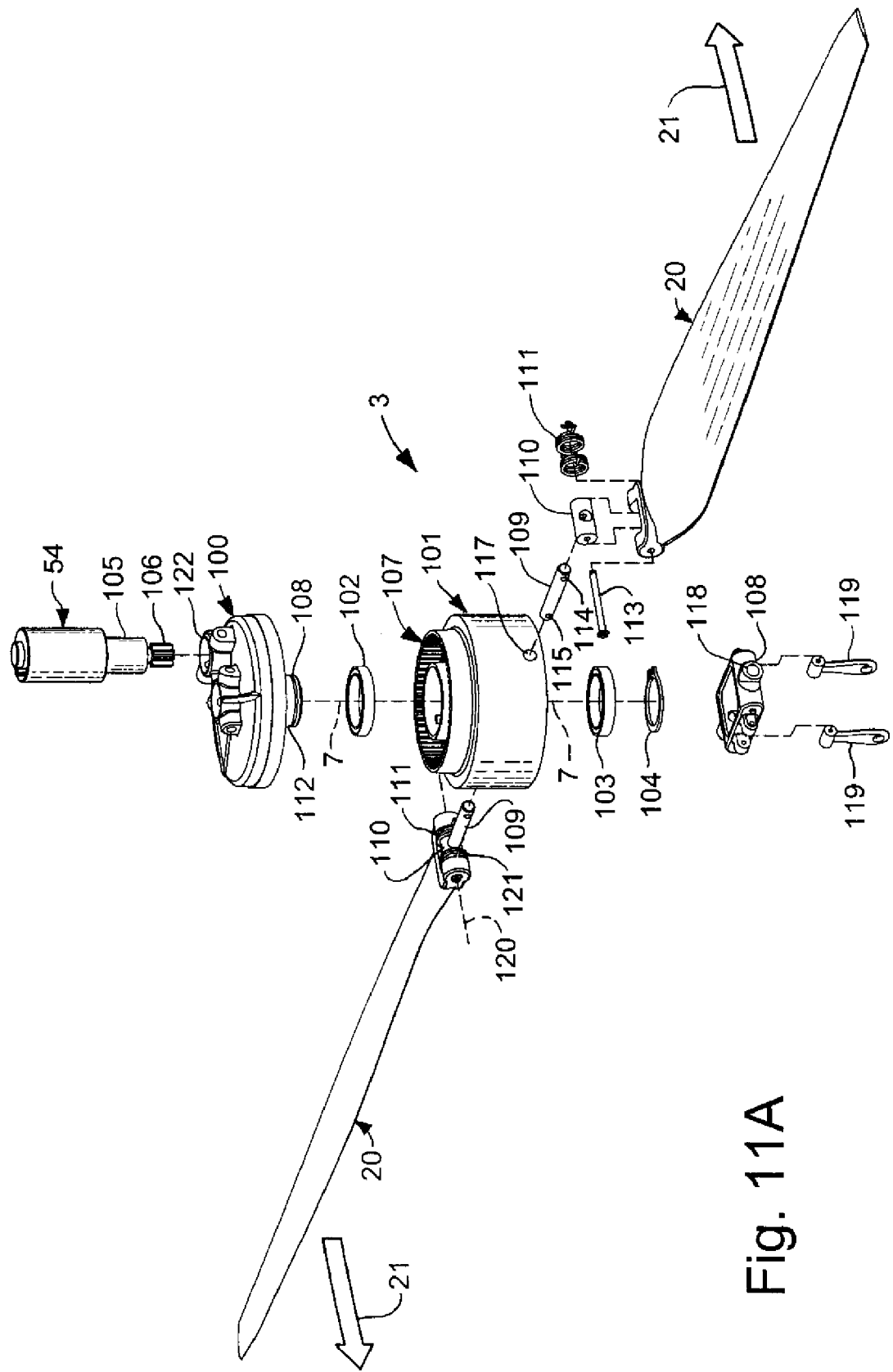
FIG. 11A is an exploded perspective view of a rotor module having rotor blades with variable cyclic pitch and fixed collective pitch.

Rotor blades 20 and 22 are coupled to rotary wing aircraft 1 and supported for rotation by rotor hubs 101. Rotor hubs 101 are further coupled for pivotable movement to an internal yolk 108, as shown best in FIG. 11A. Pivot axles 109 extend through rotor hub 101 and are received by yolk 108. Yolk 108 is adapted to couple a pair of rotor blades to hub 101 for rotation about common axis 7. Yolk 108 is further coupled to a first end of a pair of links 119. Each link 119 is further coupled on a second end to a perimeter edge of swashplate 56' or 57'. Thus, yolk 118 is pivoted by input from swashplate 56', 57' in response to linear motion input from servos 58, 59, or 98. This pivoting motion of yolk 118 in turn causes each rotor blade 20, 22 to pivot in response, thus increasing or decreasing the rotor blade pitch of rotor blades 20, 22.

Figure 2A:
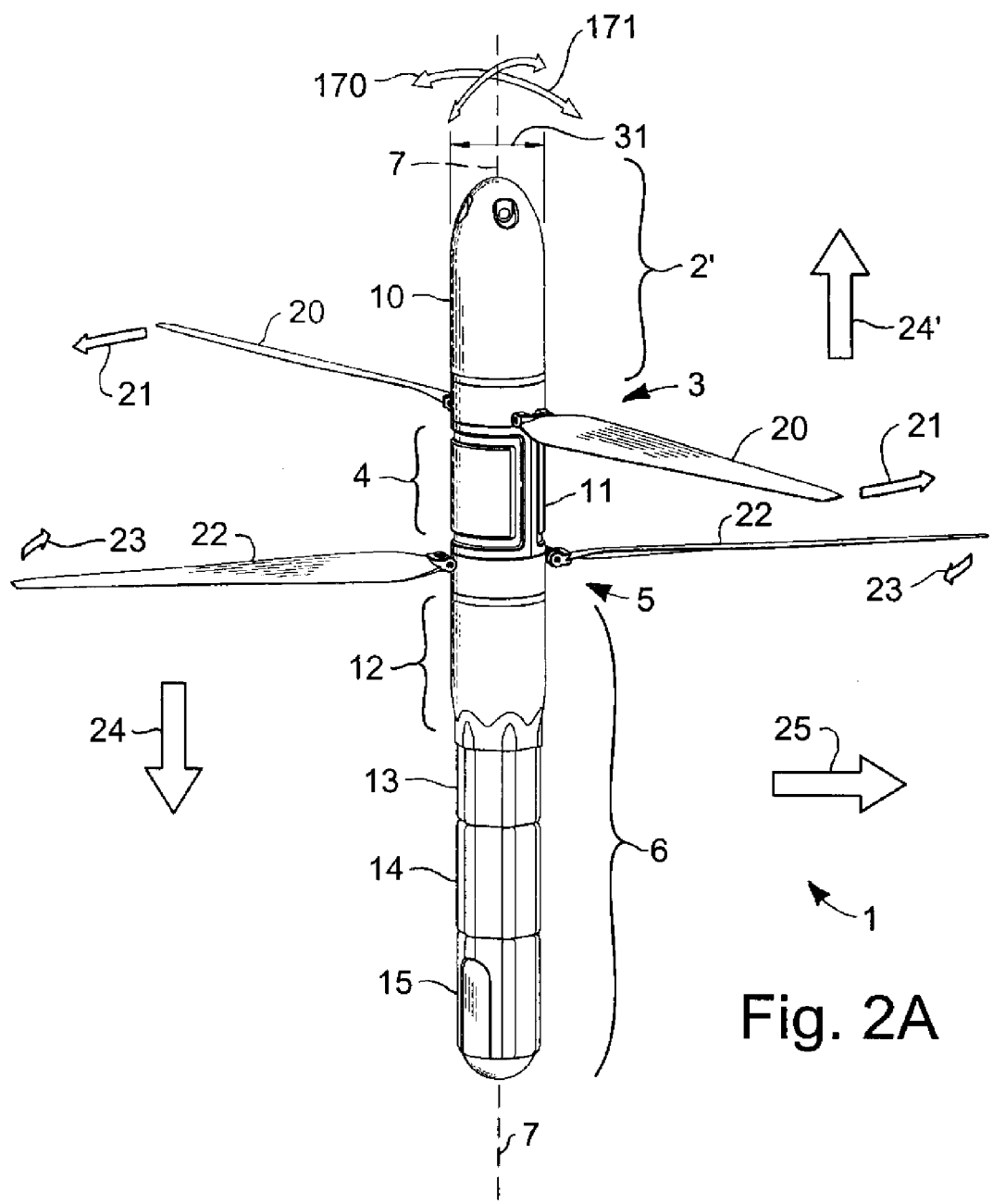
FIG. 2A is a perspective view of a rotary wing vehicle in accordance with the present disclosure showing a counter-rotating coaxial rotor system in a vertical flight mode.

As suggested in FIGS. 2A and 2B, a rotary wing vehicle 1 includes an upper section 2', first and second rotors 3 and 5, a middle section 4, a lower section 6, first and second power source modules 13, 14, and a payload 15 arranged in spaced apart relation along common axis 7. Referring now to FIGS. 2A-4, internal mechanical and electrical components within upper section 2' and middle section 4 of vehicle 1 are enclosed by a thin-walled upper body shell 10 and a middle body shell 11, respectively. A lower body shell 12 covers a portion of lower section 6, but could be extended to cover all of lower section 6. A feature of the present disclosure is that body shells 10, 11 are blow-molded from a plastic material such as polycarbonate or ABS, and, in conjunction with backbone 40, form a structure for rotary wing aircraft that has both a central strength component and a thin exterior cover component that together are stiff, strong and easy to manufacture.

Figure 10:
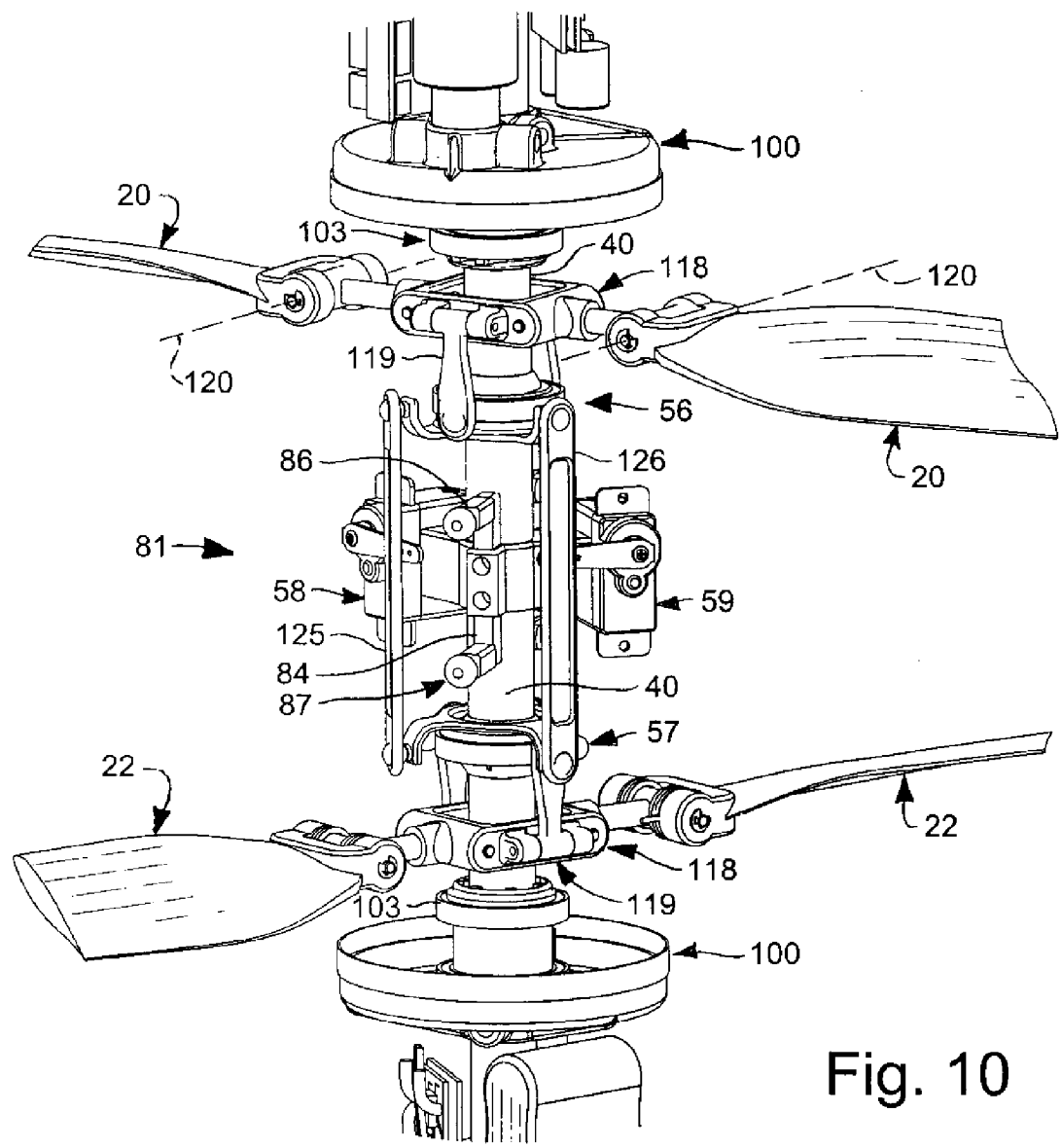
FIG. 10 is an enlarged perspective view of a middle interior section of the vehicle of FIG. 2A, with portions broken away, showing the counter-rotating coaxial rotor system.

As shown in FIG. 3, a rotary wing aircraft 1 in accordance with the present disclosure has a rotor system comprising a motor 54 operably connected to rotor blades 20 by means of a drive train such as gears 106, 107 (FIG. 11). A pitch control such as a swashplate 56' (FIG. 10) is operably connected to rotor blades 20 to vary the cyclic and/or collective pitch of rotor blades 20 in response to output from a servo actuator such as servos 58, 59 (FIG. 3) through linkages such as links 125, 126 (FIG. 10). Power such as electricity from batteries (not shown) or fuel from a storage tank (not shown) in a power source module 13 flows through a power conduit across rotor system and provides power to operate controller 55, motor 54, and servos 58 and 59. Control signals from controller 55 flow along a signal conduit and regulate the speed of motor 54 and the positioning output of servos 58 and 59. The power conduit and signal conduit are conducted between an inflow side and an outflow side of rotor blades 20 through channels 96 formed in the structural spine or backbone 40 (FIGS. 7A, 7B, and 15) of vehicle 1.

In hovering flight, first rotor 3 and second rotor 5 rotate in opposite directions about common axis 7 forcing air downward in direction 24 and lifting vehicle 1 in an upwardly direction, as suggested in FIG. 2A. First rotor 3 has rotor blades 20 configured to rotate in direction 21, and second rotor 5 has rotor blades 22 configured to rotate in direction 23 about common axis 7. Because first rotor blades 20 and second rotor blades 22 are equipped with a cyclic pitch control, vehicle 1 is configured for directional flight in direction 25 wherein common axis 7 is orientated substantially vertically.

As suggested by FIG. 2A, FIG. 2B and FIG. 25A, a rotary wing aircraft 1 comprises a fixed-wing flight structure 16, 17 supportive of horizontal flight (direction 18) in a horizontal flight mode (see FIG. 2B), and a rotary-wing flight structure 20, 22 supportive of vertical flight (direction 24') in a vertical flight mode (see FIG. 2A). Aircraft 1 is reconfigurable in flight from one flight mode to the other flight mode by jettisoning the structure associated with the alternate flight mode. As suggested by FIG. 2B, rotary wing aircraft 1 begins flight in a fixed-wing horizontal flight mode and, as suggested by FIG. 18A and FIG. 18B, converts to a rotary-wing vertical flight mode by jettisoning the fixed-wing flight structure 16, 17 in flight.

Referring now to FIG. 2B, a second embodiment contemplated by the current disclosure is depicted having a booster module 8 appended to lower section 6 at a booster interface 9. Booster module 8 contains, for example, an auxiliary power source (not shown) to augment an internal power source contained in power modules 13 and 14 carried in vehicle 1. Illustratively, the auxiliary power source (not shown) and power modules 13 and 14 are electrical batteries 13 and 14. Booster module 8 includes left and right wings 16, 17 to provide additional lift for vehicle 1 in directional flight in direction 18 wherein common axis 7 is oriented substantially horizontally.

Figure 4:
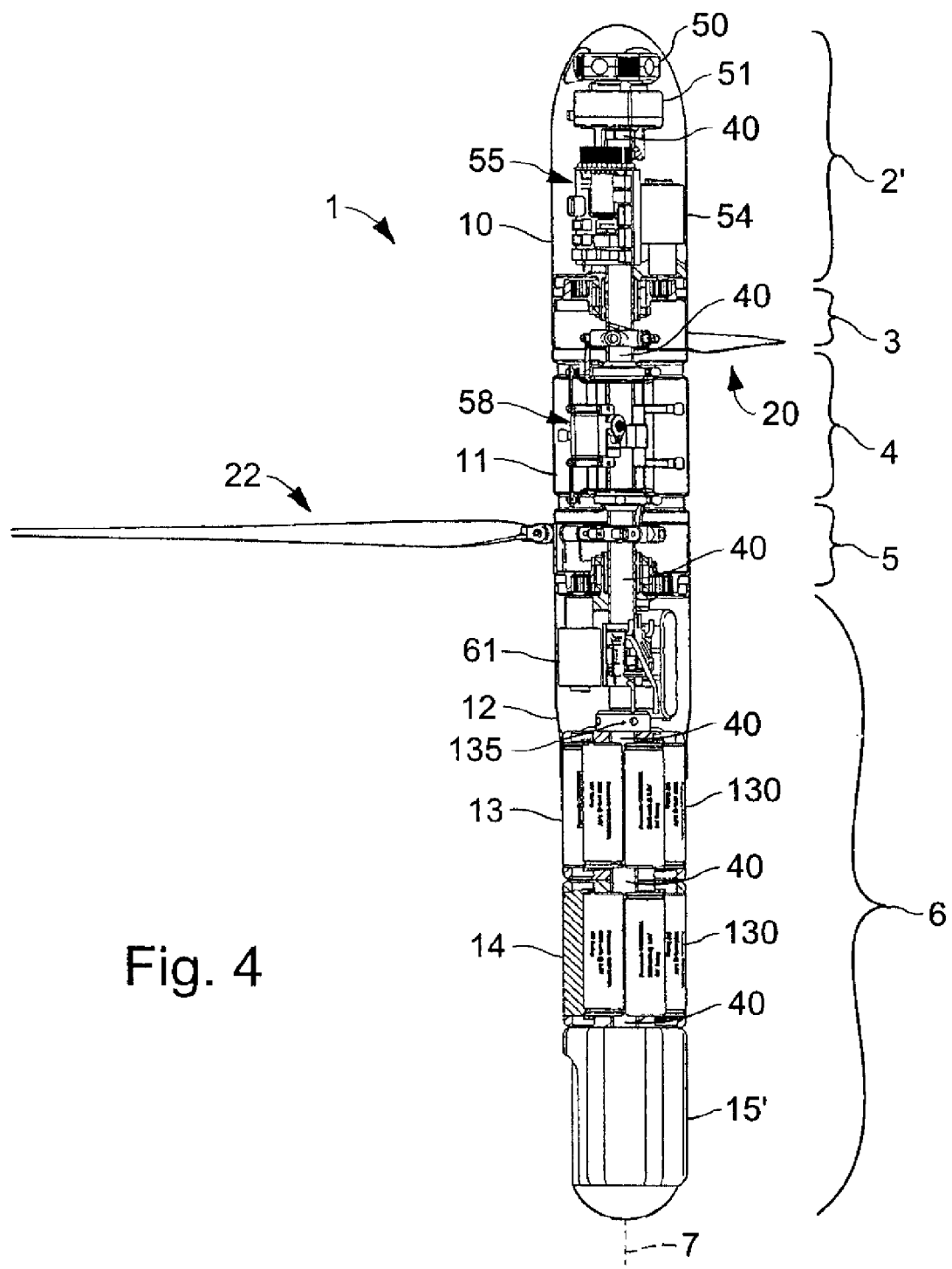
FIG. 4 is a side elevation view, with portions broken away, of the vehicle of FIG. 2A showing a counter-rotating coaxial rotor system and an electrical power source.
Figure 7:
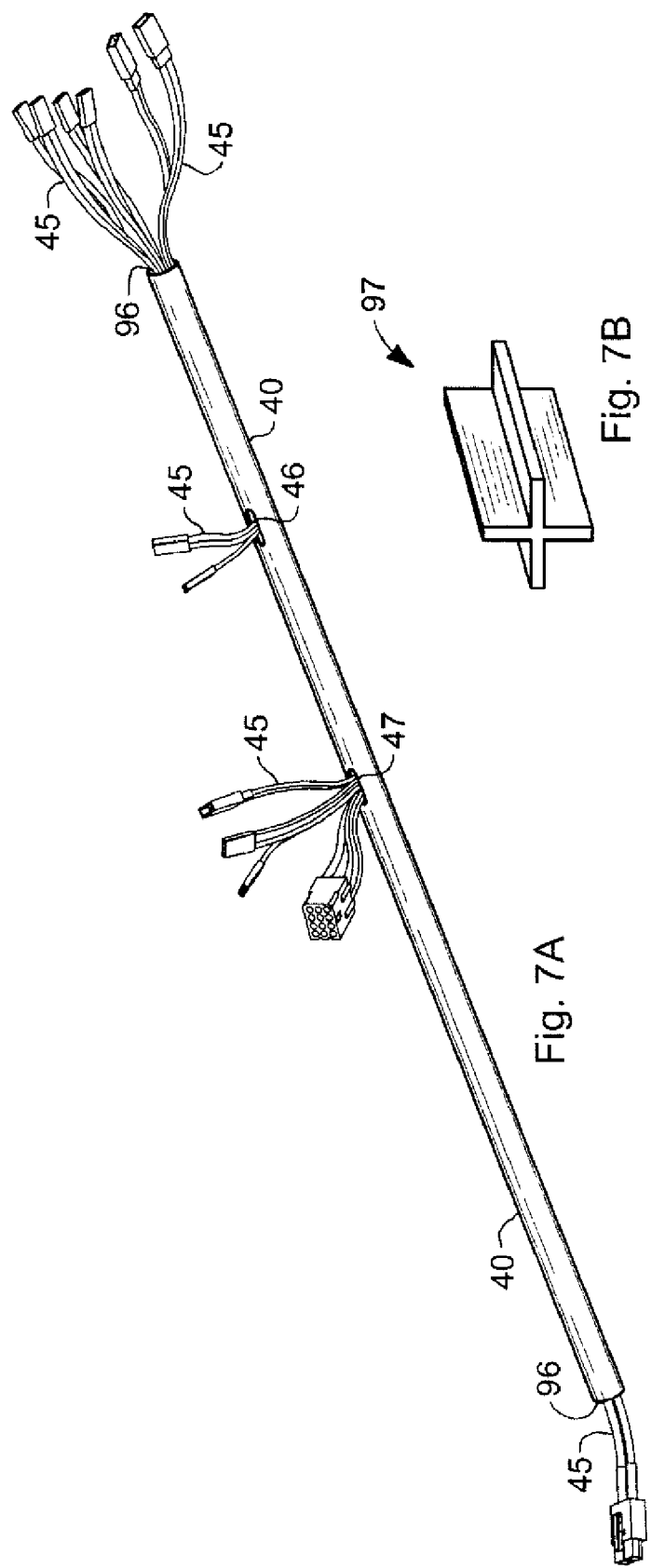
FIG. 7A is a perspective view of a core tube or backbone having a circular cross section and a hollow interior channel that is used as a conduit between sections of the vehicle and showing electrical wiring running through the hollow interior and entering and exiting at various points.
FIG. 7B is a perspective view of backbone having a generally cruciform cross section with exterior channels running the length of the backbone that can be used as conduits between sections of the vehicle.

Airframe 40 forms a structural backbone of rotary wing vehicle 1 and generally runs vertically through the center of rotary wing vehicle 1 from upper section 2' to lower section 6, as shown best in FIG. 4. Illustratively, airframe 40 is a non-rotating core tube with a hollow interior channel 96 (FIG. 7A) or a cruciform beam 97 with exterior channels (FIG. 7B). First and second rotor modules 3 and 5, all components within upper section 2', middle section 4, and lower section 6 are coupled to airframe 40. Referring now to FIG. 7A, non-rotating hollow core tube 40 further acts as a conduit for electrical wiring 45, plumbing (not shown), and mechanical linkages (not shown) passing between components in upper section 2', middle section 4, and lower section 6 of rotary wing vehicle 1. Longitudinal slots 46 and 47 are provided as entry and exits points for wiring 45, plumbing, and linkages. Since non-rotating hollow core tube 40 and cruciform beam are unitary and continuous between body sections 2, 4 and 6, the rigidity and light-weight structural properties of vehicle 1 are increased. Illustratively, non-rotating hollow core tube 40 and cruciform beam 97 are preferably made of wound or pultruded carbon graphite fiber, fiberglass, or aluminum alloy number 7075 (or similar) with an outside diameter (core tube 40) or width dimension (cruciform beam) of about 0.5 inches (13 mm) and a wall thickness of between about 0.03 inches (0.76 mm) and about 0.05 inches (1.3 mm).

Rotary wing vehicle 1 is arranged having three body sections, as shown best in FIG. 3. Upper section 2' is arranged having a horizon sensor/stabilizer 50, an electronic gyro stabilizer 51, a gyro mounting table 52 coupled to an upper end of core tube 40, a first motor speed controller 53, a first motor 54, a radio receiver, and controller 55. Middle section 4 includes a first swashplate 56', a second swashplate 57', a fore-aft cyclic servo 58, and a roll cyclic servo 59. Lower section 6 includes a second motor speed controller 60, a second motor 61, a radio battery 62, first and second battery modules 13 and 14, and payload module 15.

In the illustrated embodiment, horizon sensor/stabilizer 50 is a model "FS8 Copilot" model by FMA company, gyro stabilizer 51 is a "G500" model silicone ring gyro by JR company, motors 54, 61 are "B2041S" models by Hacker company, and motor speed controllers 53, 60 are "Pegasus 35" models by Castle Creations company which are computer-based digital programmable speed controllers. Rotary wing vehicle 1 is also configured to receive a GPS receiver/controller and telemetry system (not shown), arranged to be coupled to upper section 2'.

Figure 8:
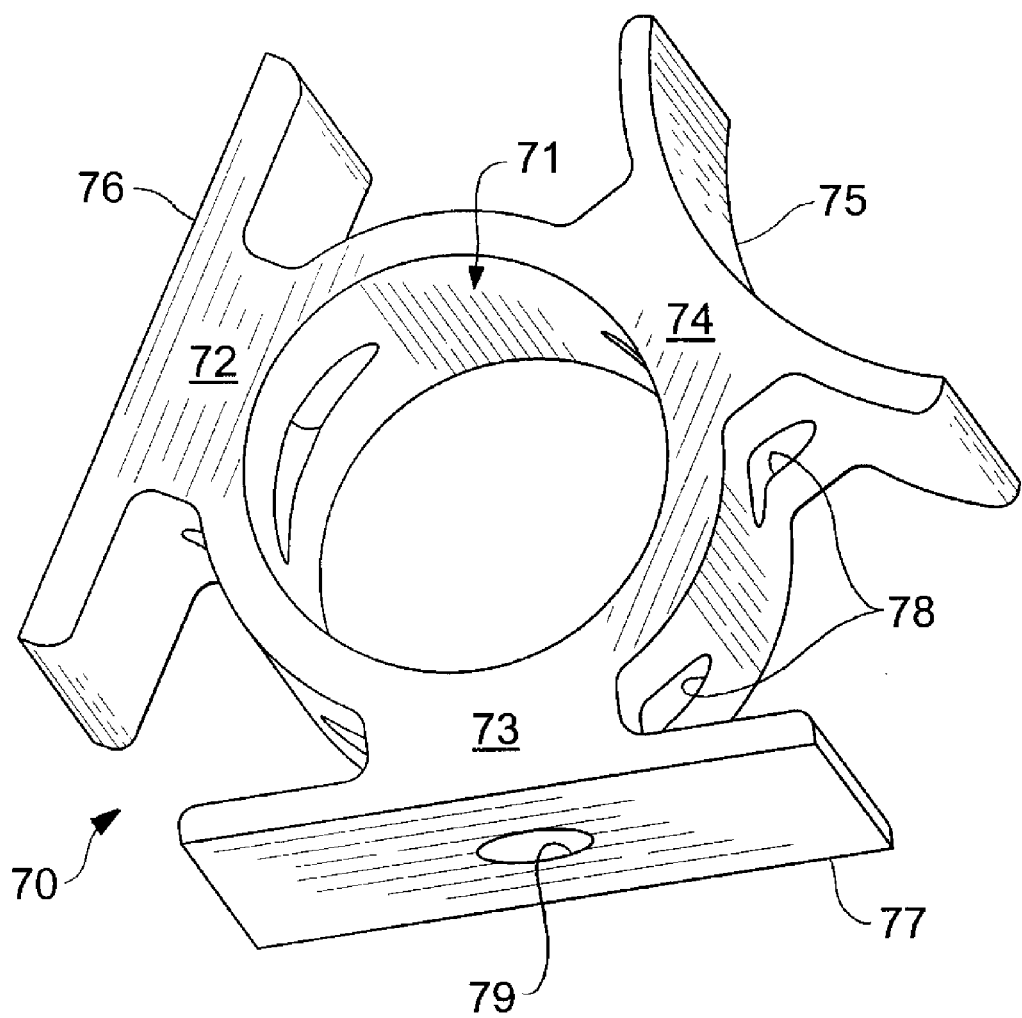
FIG. 8 is an enlarged perspective view of a first ring mount.
Figure 9:
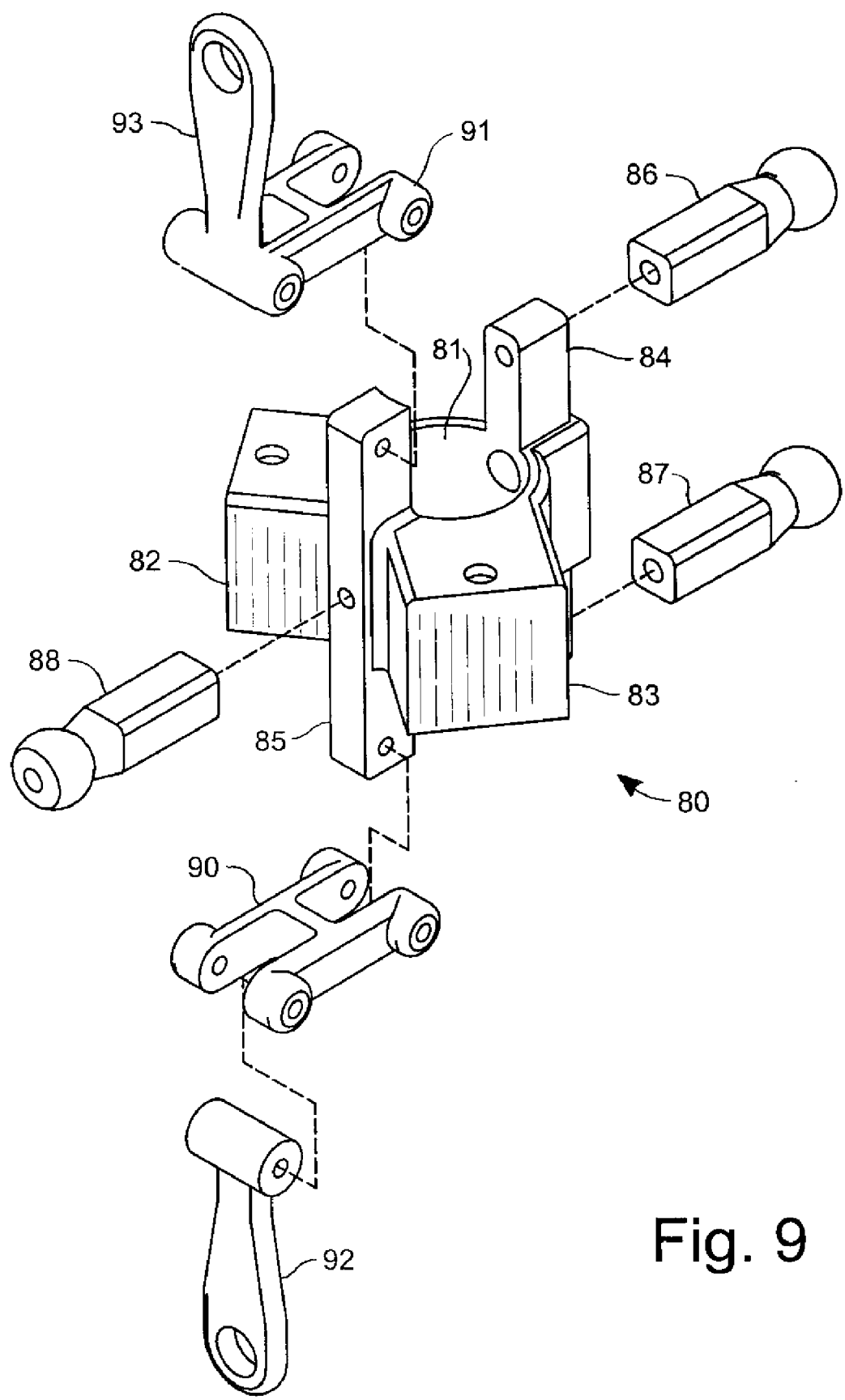
FIG. 9 is an exploded perspective view of a second ring mount showing attached linkages and body supports.

Interior components of rotary wing vehicle 1 are coupled to core tube 40 by ring mounts 70, as shown in FIG. 8. Ring mount 70 includes an annular inner portion 71 conforming to the annular exterior surface of core tube 40. Ring mount 70 includes radially extending mounting arms 72, 73, 74 having flanges 75, 76, 77 adapted to hold mechanical, electrical and other interior components of rotary wing vehicle 1. Ring mount 70 is arranged to support motor 54 in flange 75, motor speed controller 53 on flange 76, and radio receiver 55" on flange 77. Interior components of vehicle 1 are coupled, for example, to mounting flanges using a variety of fasteners (such a nylon ties through apertures 78) or adhesives. Annular portion 71 provides means for locking ring mount 70 to non-rotating hollow core tube 40 to prevent ring mount 70 from rotating or sliding axially along non-rotating hollow core tube 40. Means for locking ring mount 70 to non-rotating hollow core tube 40 includes fasteners (not shown) received by set screw receiver 79 or a variety of adhesives. A second ring mount 80, as shown in FIG. 9, includes an annular ring 81, arms 82 and 83, and axial posts 84, 85 for supporting body standoffs 86, 87, 88, swashplate anti-rotation arms 90 and 91, and swashplate links 92 and 93.

Servo module 81 includes ring mount 80 supporting pitch servo 58, roll servo 59, and universal body standoffs 86, 87 (as described in U.S. Provisional Patent Application No. 60/525,585 to Arlton which is hereby incorporated by reference herein) which support middle body shell 11, as shown, for example, in FIG. 10. Ring mounts 70, 80 are arranged to incorporate and support many structural features of rotary wing vehicle 1. Ring mounts 70, 80 assist assembly of rotary wing vehicle 1 because ring mounts 70, 80 and associated interior components can be preassembled as subassemblies and then later assembled along with other modules to non-rotating hollow core tube 40 in a final manufacturing step.

Referring now to FIGS. 11A, 12A, 12B, 13A, 13B and 14, rotor module 3 includes a rotor mount 100, a rotor hub 101 having an internal gear 107, first and second ball bearings 102 and 103, a ring clip 104, motor 54, a planetary gearbox 105, a pinion gear 106, a blade yolk 108, pivot axles 109, axle end caps 110, torsion springs 111, and rotor blades 20. A motor mount 122 is receptive to gearbox 105 to couple motor 54 to rotor mount 100. When assembled, bearings 102, 103 are retained by ring clip 104 engaging slot 108 on a boss 112 extending from rotor mount 100. Blade 20 is held in place by a pin 113 extending through cap 110 and aperture 114 formed in axle 109. Axle 109 passes through a bearing aperture 117 formed in hub 101 and into an aperture 118 in yolk 108 when it is retained by another pin (not shown). Links 119 couple yolk 108 to swashplate 56'.

Figure 11B:
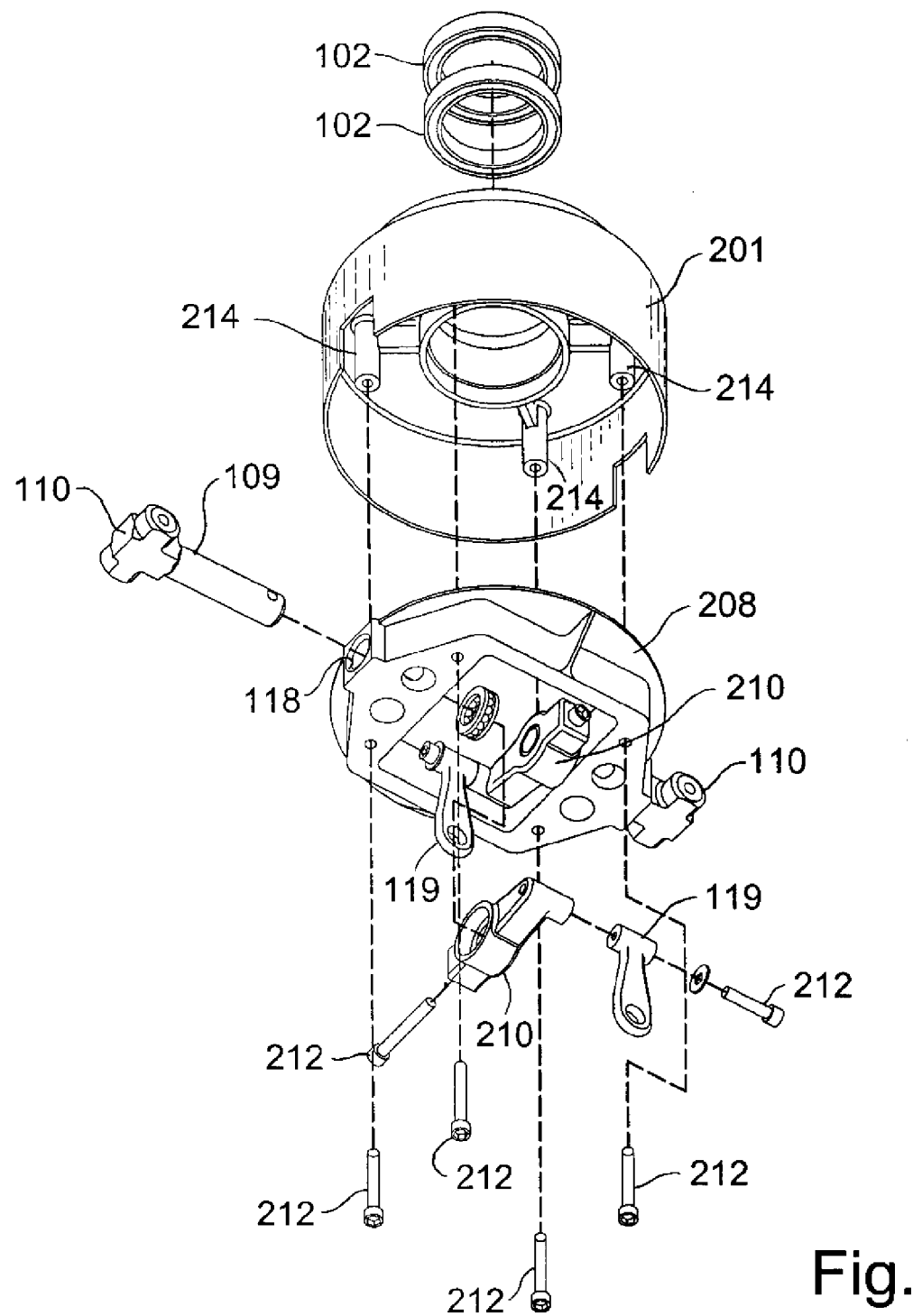
FIG. 11B is an exploded perspective view of a rotor module having rotor blades with variable cyclic and variable collective pitch.
Figure 12B:
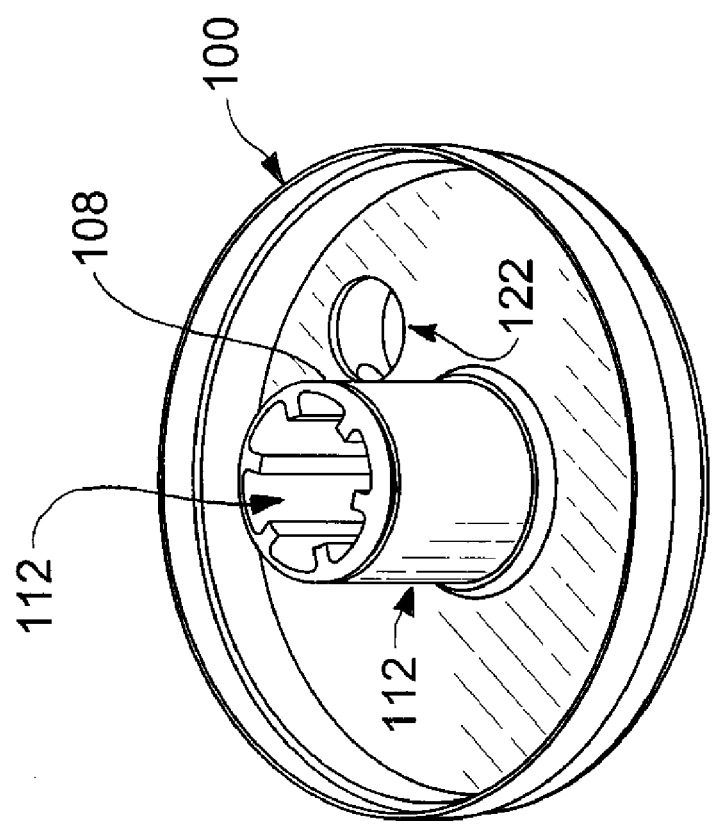
FIGS. 12A and 12B are perspective views of a first side and a second side of a motor mount.
Figure 12A:
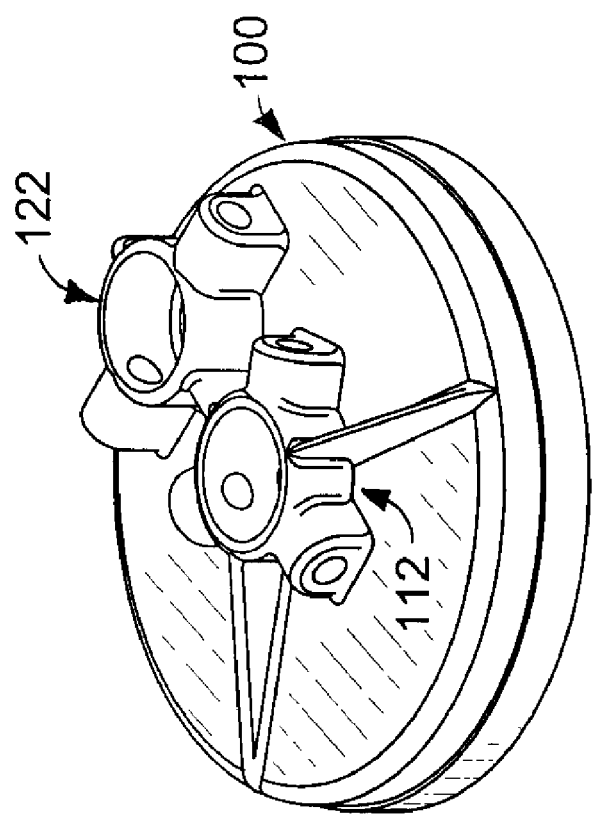
Figure 13B:
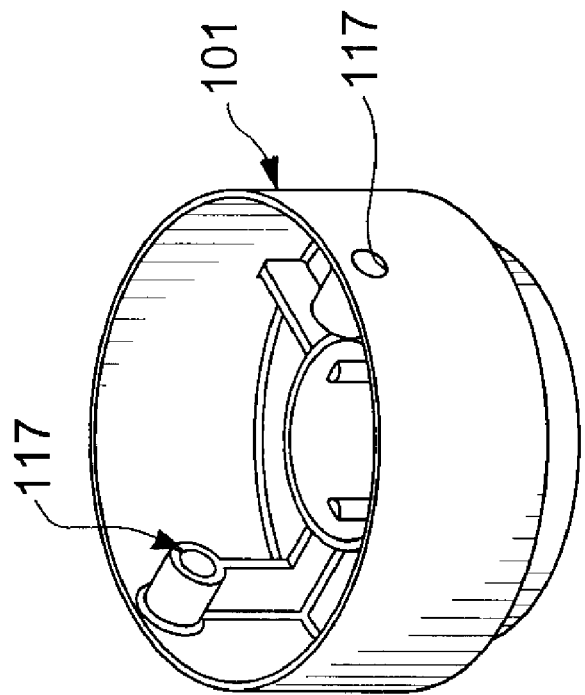
FIGS. 13A and 13B are perspective views of a first side and a second side of a rotor hub.
Figure 13A:
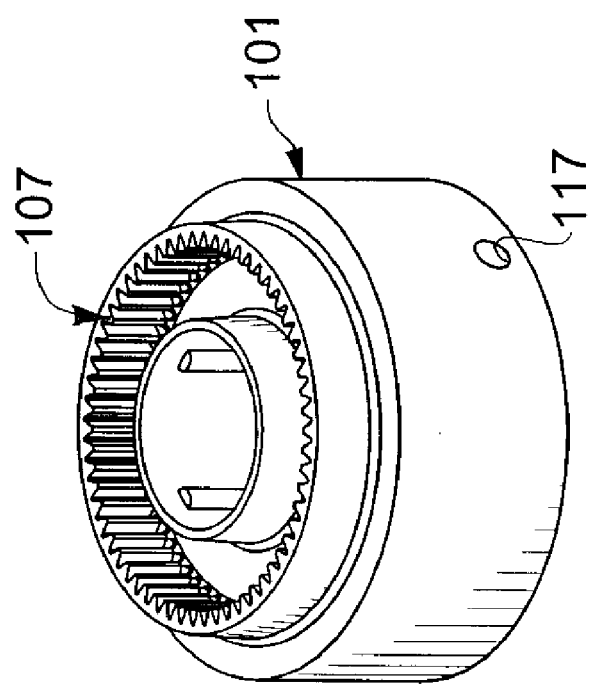
Figure 14:
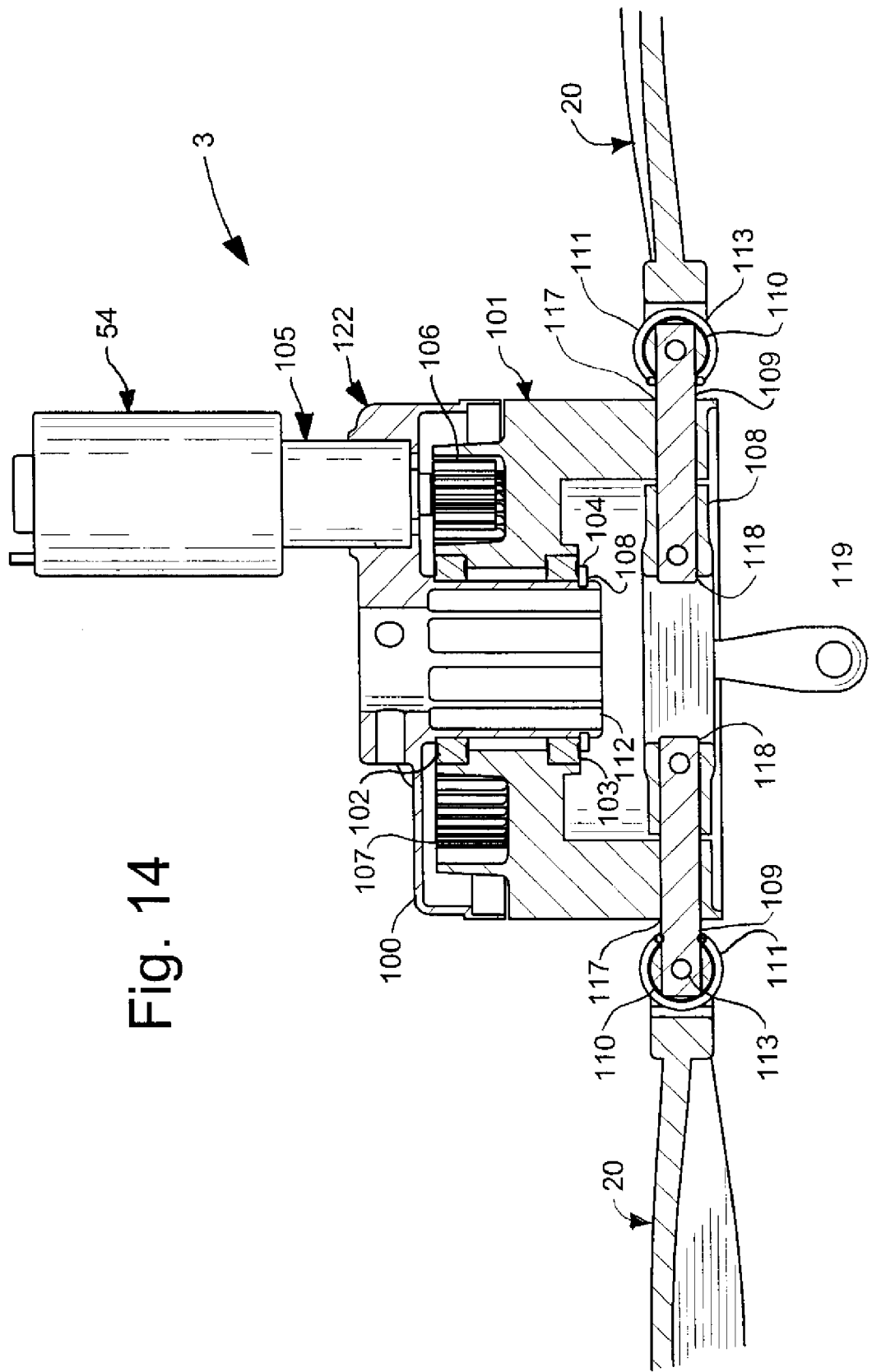
FIG. 14 is a sectional view taken along lines 14-14 of FIG. 2B, showing the rotor module.

As shown in FIG. 11B, a rotor module adapted to support both cyclically and collectively pitchable rotor blades includes collective rotor hub 201 that is similar to hub 101 and receptive to a collective yolk frame 208 coupled to bosses 214 formed on an interior surface of hub 201 by fasteners 212. Collective yolk frame 208 supports the radial flight loads produced by rotor blades 20 acting through thrust bearings 203. Links 119 couple pitch arms 210 to swashplate 56'.

Illustratively, planetary gearbox 105 has a reducing speed ratio of about 4:1. Pinion gear on motor 54 has nine teeth and engages internal gear 107 on rotor hub 101 which has sixty teeth, so the total speed reduction ratio of rotor module 3 is about 26.7:1 (that is, the output shaft of motor 54 turns 26.7 times for each turn of rotor hub 101). This reduction ratio encourages the use of high efficiency electric motors running at high voltages and high speeds.

Illustratively, motor 54 is a brushless motor. In some applications, especially where flight times are short and economy is a factor (for example, in a short-range disposable munition) several low-cost brushed motors (i.e. motors having carbon brushes and rotating commutators) are used in place of one high-cost brushless motor 54 to turn rotor hub 101. In such cases, while rotor module 3 is shown having one motor 54 to drive rotor hub 101, it is within the scope of this disclosure to include several motors around the circumference of rotor mount 100 to drive rotor hub 101 instead of only one. It is also anticipated that rotor hub 100 itself can be configured with wire coils and magnets to act as a motor so that no separate motors are required to drive rotor hub 101 about common axis 7.

Rotor blade 20 in the embodiment shown is injection molded of polycarbonate plastic material and is of the type described in U.S. Pat. No. 5,879,131 by Arlton, which patent is hereby incorporated by reference herein. Rotor blade 20 is free to flap upward and downward about 6 degrees about flapping axis 120 before tabs 121 on torsion springs 111 contact pitch axle 109 and resist further flapping. This means that rotor blades 20 can flap up and down freely in flight about +/−6 degrees and can fold upward 90 degrees and downward 90 degrees for storage or during a crash landing.

In the embodiment shown in the drawings, rotor mount 100 is injection molded in one piece from a thermoplastic material such as polycarbonate or nylon. Rotor hub 101 is injection molded in one piece from a thermoplastic material such as nylon or acetal. Rotor blades 20 are supported in flight by rotor hub 101 (which forms part of the exterior body shell of vehicle 1) instead of by traditional coaxial shafts coincident with common axis 7. This places rotor support bearings 103, 104 very close to rotor blades 20 and frees space within the central body portion of rotary wing vehicle 1 for other mechanical or electrical components. In a fixed-pitch rotor system (shown in the drawings) radial flight forces produced by rotating blades 20 are supported by internal yolk 108 which connects two rotor blades 20 and which includes an internal aperture surrounding and bypassing core tube 40, thus no special thrust bearings are required.

Figure 15:
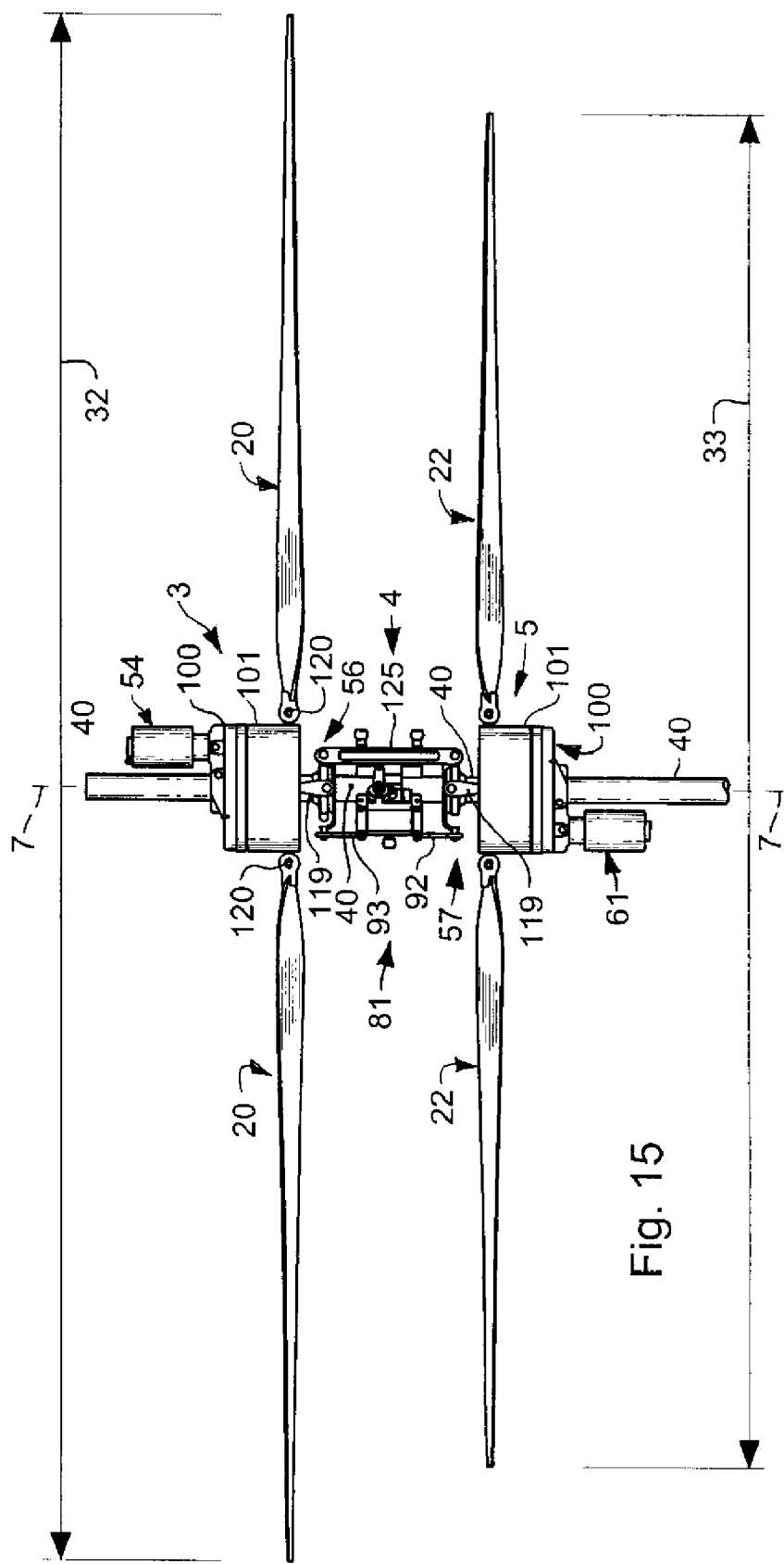
FIG. 15 is a side elevation view of the counter-rotating coaxial rotor system of FIG. 2A, and a core tube depending from the rotor system.

Referring now to FIG. 15, a coaxial rotor system in accordance with the current disclosure comprises core tube 40, two rotor systems 3, 5, two swashplates 56' and 57', and one servo module 81 coupled to non-rotating hollow core tube 40 in mirrored symmetry around servo module 81. While a coaxial rotor system with two rotors is disclosed, rotary wing vehicle 1 could be equipped with additional rotor systems (not shown) spaced apart along the length of non-rotating hollow core tube 40 for additional thrust or operational capabilities.

In the illustrated embodiment, rotary wing vehicle 1 has a fixed-pitch rotor system which requires only two servos 58, 59 for aircraft pitch (fore-aft cyclic) and aircraft roll (right-left cyclic) control. A third collective servo 98 can be mounted in a similar fashion in middle section 4, for instance, if collective pitch control is desired.

Rotor systems 3,5 are connected to swashplates 56', 57' by pitch links 119. Servos 58, 59 are connected to swashplates 56', 57' by links 125, 126. In operation, rotor hubs 101 rotate in opposite directions. Servos 58, 59 are controlled by onboard flight control electronics 55' to tilt simultaneously swashplate 56' and swashplate 57' which then cyclically vary the blade pitch angle of rotating rotor blades 20 to tilt vehicle 1 in one of aircraft pitch direction and aircraft roll direction. In another embodiment having collective pitch (see FIG. 11B), a third servo and third pitch link (not shown) are provided to vary the axial location of swashplates 56', 57' along common axis 7 and to vary the collective pitch of rotor blades 20, 22 using electronic Collective-Cyclic Pitch Mixing (CCPM). Using servos positioned to lie between rotor systems 3, 5 and directly coupling control swashplates 56', 57' with linkages to control a coaxial rotor system in this way is a feature of the embodiment.

An illustrative feature of the disclosure is that motors 54, 61 are positioned to lie on opposite sides of (above and below) rotors 3, 5 with power transmission between the rotors accomplished through electrical wiring 45 instead of mechanical shafting thereby reducing mechanical complexity and weight. In another embodiment (not shown), motors 54, 61 are positioned to lie between the rotors, and servo actuators 58, 59 are positioned to lie in spaced-apart relation to locate rotors 3, 5 therebetween. Because power and control of the rotor system is entirely electrical in nature, the entire control system of rotary wing vehicle 1 can be operated electrically by digital computers and solid-state electronics without mechanical linkages or hydraulic amplification. Locating two sets of motors on opposite sides of rotors 3, 5, and on opposite sides of servo module 81 eliminates the need for concentric rotating shafting between rotors 3, 5, and positions servos 58, 59 to drive both swashplates 56', 57' directly.

A feature of the present disclosure is that vehicle 1 can be flown with as few as one or two cyclic servo actuators (servo 58, 59). In a one-servo flight mode, differential torque of motors 54, 61 controls yaw orientation, and servo 58 controls forward and backward flight. With only one cyclic servo, vehicle 1 can be flown much like an airplane having only rudder and elevator control. In a two-servo flight mode, as illustrated in the drawings, servos 58, 59 provide fore/aft aircraft pitch and right/left aircraft roll control with differential torque of motors 54, 61 providing yaw control.

Figure 16A:
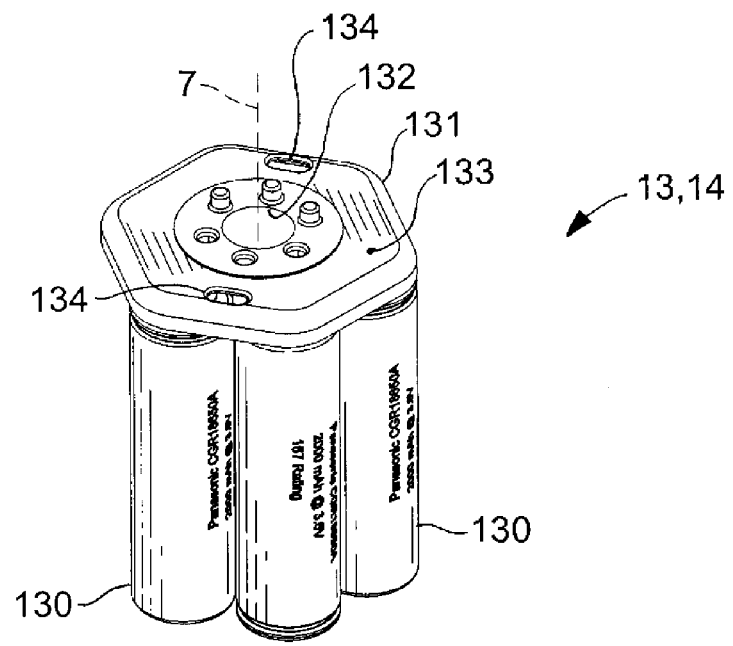
FIGS. 16A and 16B are exploded perspective views of a single power module including several batteries.
Figure 16B:
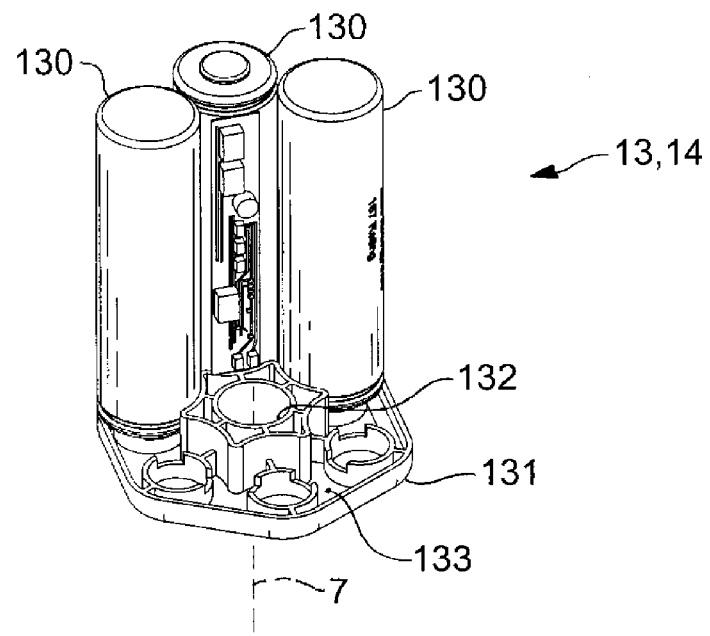

In another embodiment of the current disclosure, power to drive motors 54, 61 in flight is provided by high-capacity electric batteries 130 such as lithium-polymer or lithium-ion batteries, or fuel cells. Referring now to FIGS. 16A and 16B, power module 13 has six rechargeable lithium ion batteries 130 arranged in a hexagonal pattern around non-rotating hollow core tube 40 and wired in series to produce about 21.6 volts of electrical potential. Battery ring mount 131 is formed to include center aperture (ring) 132 to accommodate non-rotating hollow core tube 40 and flange 133 to hold batteries 130. Power wires 45 from battery module 13 enter non-rotating hollow core tube 40 at opening 47 (see FIG. 7A), and are routed through non-rotating hollow core tube 40 to motor speed controllers 53, 60.

As shown best in FIG. 25A multiple power modules 13, 14 are provided for additional energy capacity during flight and are, illustratively, wired in parallel to increase the electrical current available to motors 54, 61. Flight times of rotary wing vehicle 1 can be adjusted by adjusting the number of power modules 13, 14 carried in flight.

Extra locking rings (or ring mounts with no radial arms) 135 are provided above and below power module 13, 14 to help couple power modules 13, 14 to non-rotating hollow core tube 40, as shown, for example, in FIG. 4. Since power modules 13, 14 are relatively heavy compared to other components of vehicle 1, locking rings 135 prevent power modules 13, 14 from sliding along non-rotating hollow core tube 40 during a crash landing of rotary wing vehicle 1. A feature of the present disclosure is that rotary wing vehicle 1 is well-suited to be manufactured and assembled in modules. Rotor, wing, control, power, booster, electronics, and payload modules are manufactured separately and slid onto core tube 40. Electrical connectors for connections passing through openings 46, 47 in core tube 40 are mounted flush with the surface of core tube 40 to assist in assembly and disassembly of vehicle 1 for maintenance and repairs.

Energy density and power density are considerations in UAV design and can be applied to an aircraft as a whole. Aircraft with higher energy densities and power densities have better overall performance than aircraft with lower densities. In general, energy density and power density are defined as the amount of energy and power available per unit weight. For example, the energy density of a fuel or electric battery (also known as "specific energy") corresponds to the amount of energy contained in a unit measure of fuel or battery (measured, for instance, in Nm/Kg or ft-lbs/slug).

Chemical (liquid) fuels tend to have higher energy densities than electric batteries. One additional characteristic of liquid fuel power as compared to electric battery power is that the weight of a liquid fueled aircraft decreases over the course of a flight (as much as 60%) as it burns fuel. Consequently the energy density of a liquid fueled aircraft (i.e., the energy available per unit weight of the aircraft) decreases slowly and power density (power available per unit weight) increases as it flies. This means that the performance of liquid fueled aircraft actually improves near the end of a flight.

In contrast, the overall power density of an electric-powered aircraft is constant throughout the flight because the maximum output power of the batteries is almost constant and the batteries do not lose weight as they discharge. Energy density also decreases quickly because the total energy available decreases. To improve energy and power density of the current disclosure, an auxiliary electric booster or power module 8 is provided that can be jettisoned in flight after its energy supply is depleted. Thus, booster module 8 comprises additional battery modules (not shown) assembled around common axis 7 with a mechanism to retain booster module 8 to rotary wing vehicle 1.

In another embodiment, booster 8 includes an internal combustion engine (such as a diesel engine not shown) which drives an electric generator (not shown) to convert chemical energy contained in a chemical fuel to electrical energy. In other embodiments contemplated by this disclosure, a turbo-electric generator system (not shown) may be used to create electrical energy. A consideration of a booster module 8 containing such a gas-electric generator is that the entire weight of the module, fuel system, and engine, can be jettisoned at the end of a first flight phase leaving the relatively low weight rotary wing vehicle 1 to complete a second flight phase.

Figure 17:
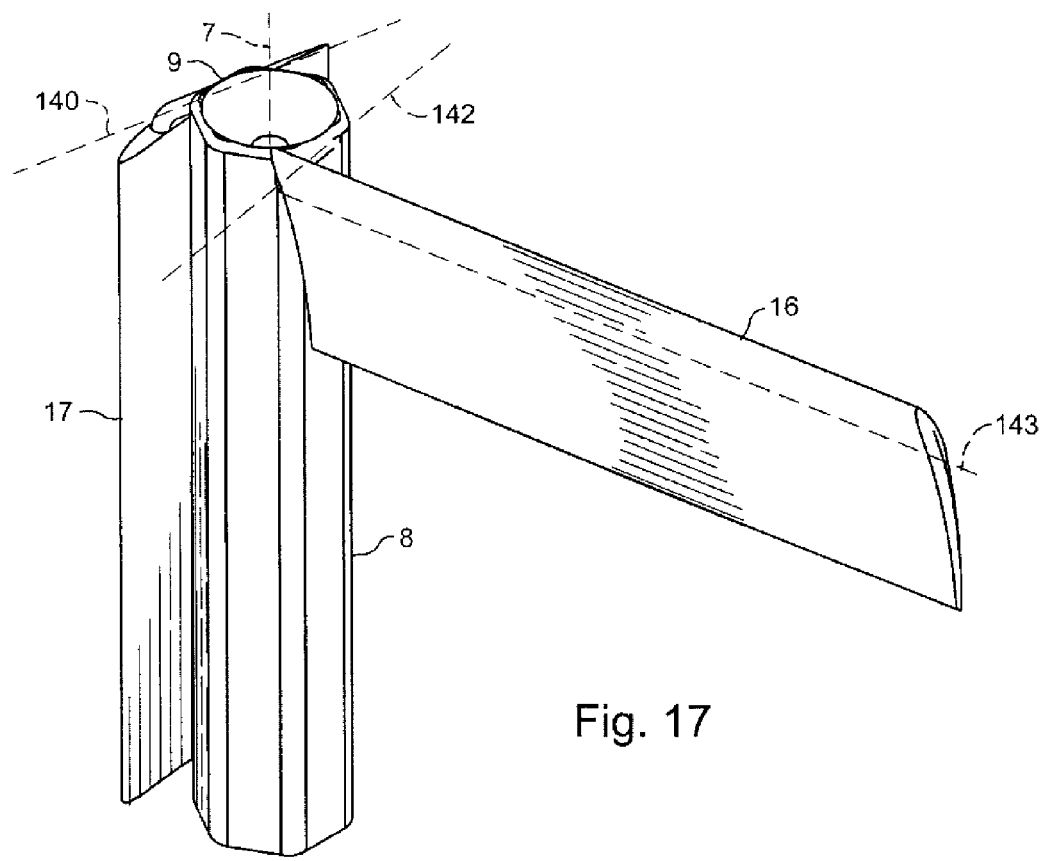
FIG. 17 is an orthographic view of the booster module of FIG. 2B showing one wing folded for storage and one wing extended in a flight configuration.

In the illustrative embodiment, booster module 8 includes foldable wings 16, 17 to increase lift in a horizontal flight mode of rotary wing vehicle 1. As shown in FIG. 17, wing 17 is folded about folding axis 140 for compact storage. Wings 16, 17 are attached at about their "quarter chord" location to pivot shafts (not shown). When deployed for flight with pivot shafts held rigidly perpendicular to common axis 7 (see also FIG. 2), wing 16 is free to pivot about pitch axis 143 to find its own best angle of attack. Because wings 16, 17 are free to rotate about their own pitch axes in flight, appendages such as wings 16, 17 are sometimes referred to as "free-wings." It should be noted that wings 16, 17, being free-wings, can operate efficiently over a wide speed range because of their ability to change pitch automatically to meet the oncoming airflow. Application of such a free wing to a rotary wing UAV is a feature of the disclosure.

In high-speed horizontal flight, common axis 7 is orientated substantially horizontally with rotor modules 3, 5 together acting like a single counter-rotating propeller to pull rotary wing vehicle 1 in a horizontal direction 18. Wings 16, 17 help to lift lower section 6 and booster module 8 so that rotor modules 3, 5 can apply more power to forward propulsion and less to vertical lifting.

It should also be noted that the current disclosure does not require aerodynamic control surfaces (such as on wings 16, 17) because cyclic control of rotor module 3, 5 provides control power for maneuvering in aircraft pitch (elevation) direction 144 and aircraft yaw (heading) direction 145 when common axis 7 is substantially horizontal. Airplane-style roll control (about common axis 7) during high-speed horizontal flight is accomplished through differential torque/speed of rotor modules 3, 5. FIG. 2A, FIG. 2B and FIG. 25A suggest a method of controlling the angular orientation of a fixed-wing aircraft 1 having counter-rotating rotor blades 20, 22, the method comprising varying cyclic blade pitch of the rotor blades 20, 22 to control aircraft pitch (direction 144) and yaw (direction 145), and varying the rotational speed of the rotor blades 20, 22 to produce differential torque between the rotors 20, 22 to control aircraft roll (rotation about common axis 7). This method of control for horizontal flight of a rotary-wing UAV is a feature of the illustrative embodiment.

Figures 18A, 18B:
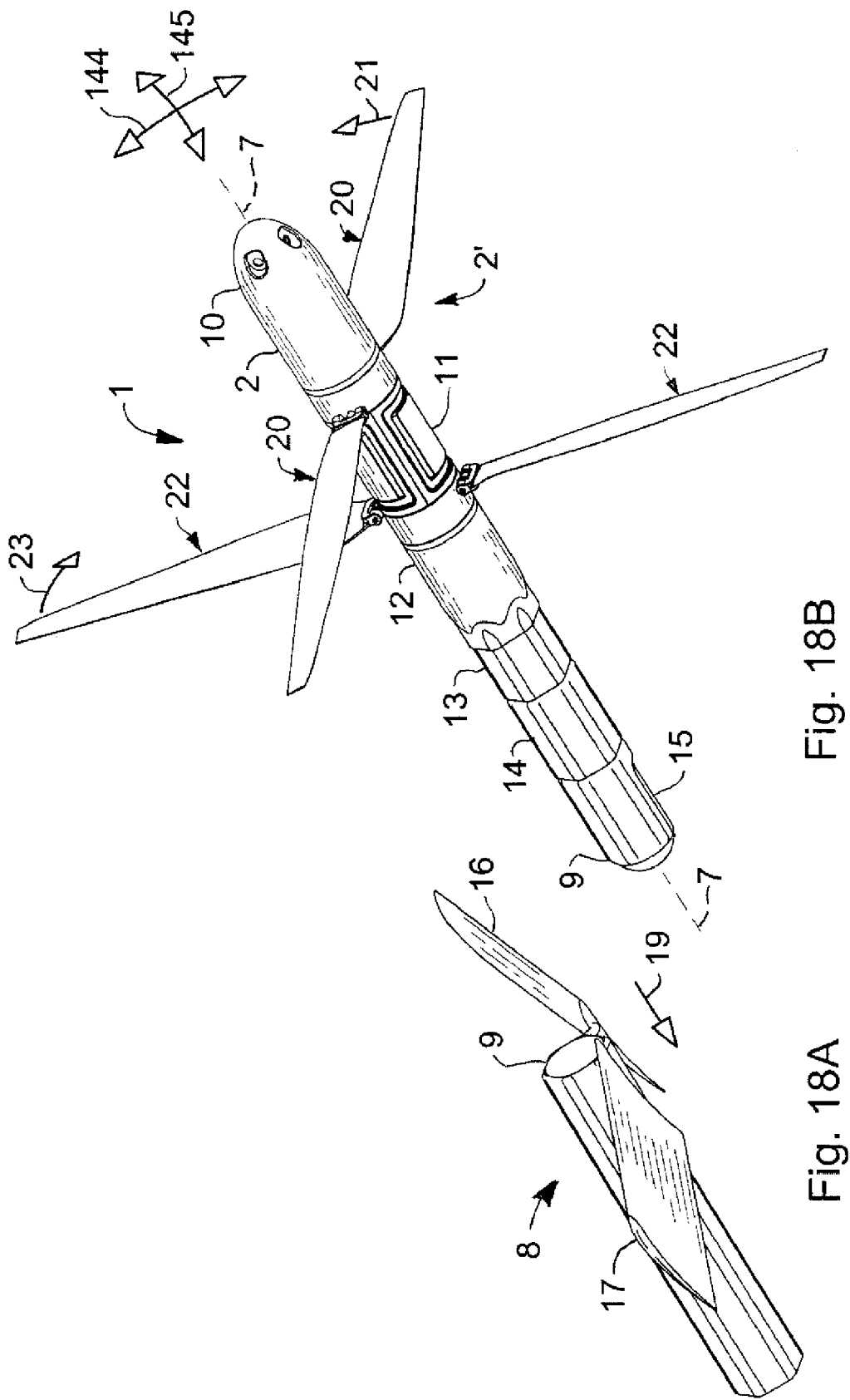
FIG. 18 is an orthographic view depicting the booster module separating in flight from the rotary wing vehicle.

Referring now to FIGS. 18A and 18B, when the energy of booster module 8 has been depleted, a command from on-board controller 55 of rotary wing vehicle 1 actuates a mechanism such as a latch (not shown) that separates booster module 8 from rotary wing vehicle 1 and booster module 8 falls away in direction 19. Rotary wing vehicle 1 then, in one flight mode, assumes a more vertical orientation and flies like a helicopter.

Figure 19:
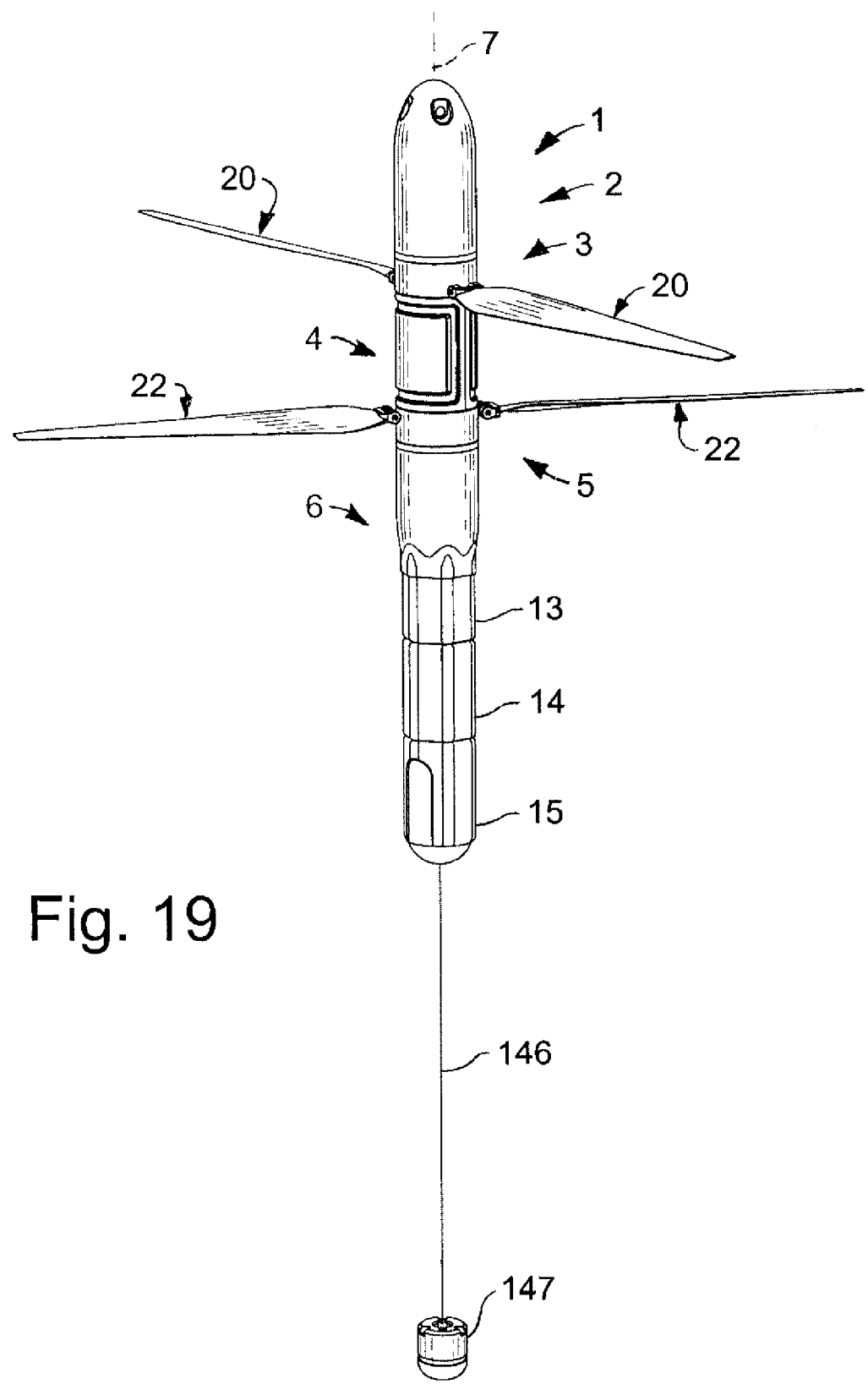
FIG. 19 is an elevation view of the rotary wing vehicle showing a dipping sonar or hydrophone assembly depending from a bottom portion of the vehicle.

In another embodiment, booster module 8 includes a mission-specific payload 147 such as an explosive munition, dipping sonar, hydrophones, radio ID marker, or a sonobouy. As illustrated in FIG. 19, upon separation from rotary wing vehicle 1, booster module 8 falls away leaving a sonar or hydroponic system 147 or other sensor connected to rotary wing vehicle 1 by wire or fiber optic cable 146 so that rotary wing vehicle 1 can move payload 147 from place to place, deliver payload 147 accurately to a desired location, and act as a telemetry link between payload 147 and a remote receiver (not shown). This can be an effective method of, for example, monitoring a target or marking a ship at sea with a remote radio ID marker or other marking instrument.

FIG. 22 illustrates a method of delivering a marker comprising, for example, a sensor, or a marking device, such as indelible paint or a radio transmitter, to a remote location, in this case a ship on an open ocean 157. Vehicle 1 is shown approaching ship S (in frame), maneuvering to touch ship S and leaving the marker on ship S (in frame) and exiting the area (in frame). This method of marking is a feature of the present disclosure that allows a point of interest to be monitored after vehicle 1 has left the local area. Alternatively or in conjunction, vehicle 1 can retain a sensor when it leaves the local area which may, for instance, have taken a sample of the atmosphere near ship S, and return the sensor and sample to a remote processing point for further analysis by a mass spectrometer, biological or radiological measuring device or other such device (not shown). While the point of interest shown in the drawings as a ship S, it will be understood that ship S could be any other point of interest accessible to vehicle 1 such as a truck, aircraft, building, tower, power line, or open area of land.

Another embodiment of the current disclosure shown in FIGS. 20A, 20B and 20C, has unequal length folding, coaxial rotor blades 148, 149 with upper blades 148 having a greater span than lower blades 149. This is a feature arranged so that during a crash landing of vehicle when upper blades 148 contact the ground 155 before lower, shorter blades 149 so that upper blades 148 fold away from, or faster than, lower blades 149 thereby reducing the possibility that upper blades 148 and lower blades 149 will contact each other while still rotating at high speed. As shown in the drawings, lower blades 149 span about 20 to 22 inches (51 cm to 56 cm).

Figures 21A, 21B:
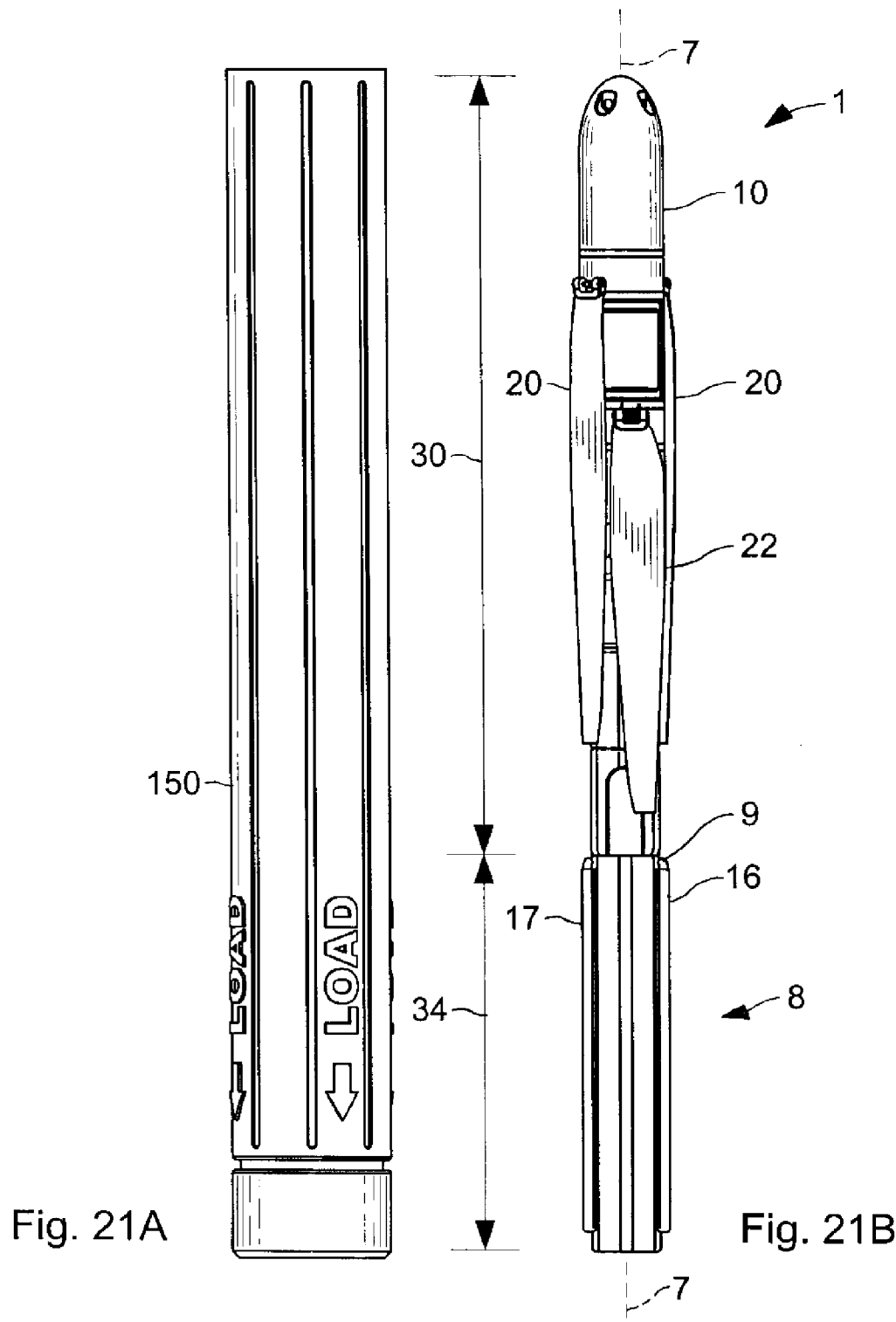
FIGS. 21A and 21B are side elevation views of a storage tube and the rotary wing vehicle showing the vehicle folded for storage.

The ability to fold for compact storage and for landing is another feature of the current disclosure. As shown in FIGS. 21A and 21B, rotary wing vehicle 1 is compact enough to fit inside a standard A-size sonobouy tube used by the United States Navy. The unique core-tube structure of the current disclosure not only allows rotary wing vehicle 1 to be miniaturized to fit within a sonobouy tube, it also absorbs the forces of launch with a Charge Actuated Device (CAD) from an aircraft such as the Navy's P-3 maritime surveillance aircraft.

In one embodiment suggested in FIG. 21A, disposable launch canister 150 is provided to protect the aerodynamic surfaces of rotary wing vehicle 1 as it is launched from an aircraft traveling 150-250 knots at an altitude of 10,000 to 20,000 feet. A parachute (not shown) attached to canister 150 slows and stabilizes the descent of canister 150 which separates from rotary wing vehicle 1 at a lower altitude. Illustratively, rotary wing vehicle 1 is shown to scale and has a body length 30 of about 24 inches (51 cm), upper diameter 31 of about 2.25 inches (5.7 cm), upper rotor diameter 32 of about 28 inches (71 cm) and lower rotor diameter 33 of about 24 inches (61 cm) or less. Booster module 8 has a length 34 of about 12 inches (30 cm). First rotor 3 and second rotor 5 rotate at about 1400 RPM in hovering flight and at about or above 2000 RPM during vertical ascent and high-speed maneuvers.

Figure 23:
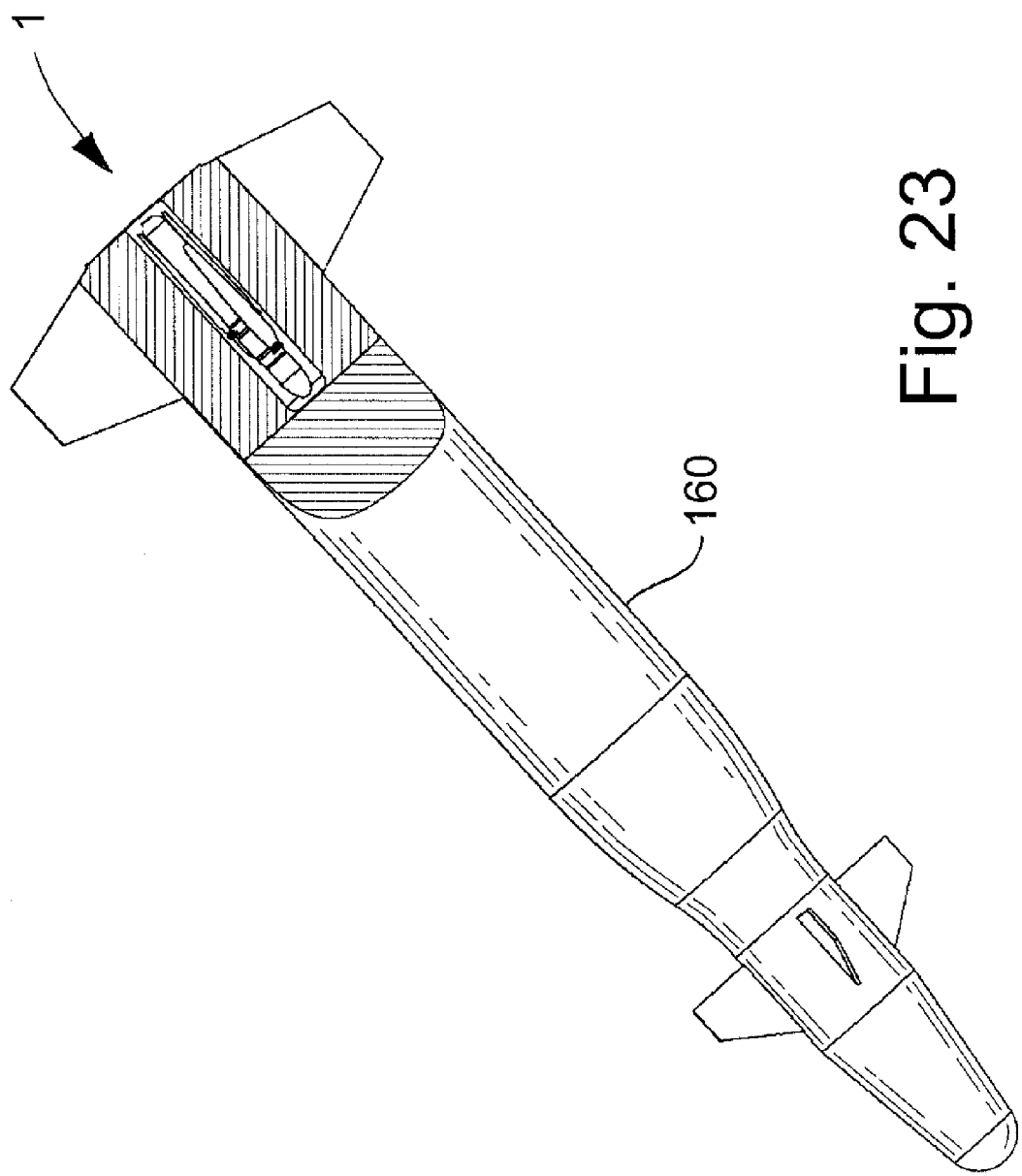
FIG. 23 is a side elevation view of a rotary wing vehicle folded for storage in a rear portion of a gravity-delivered bomb.
Figure 24:
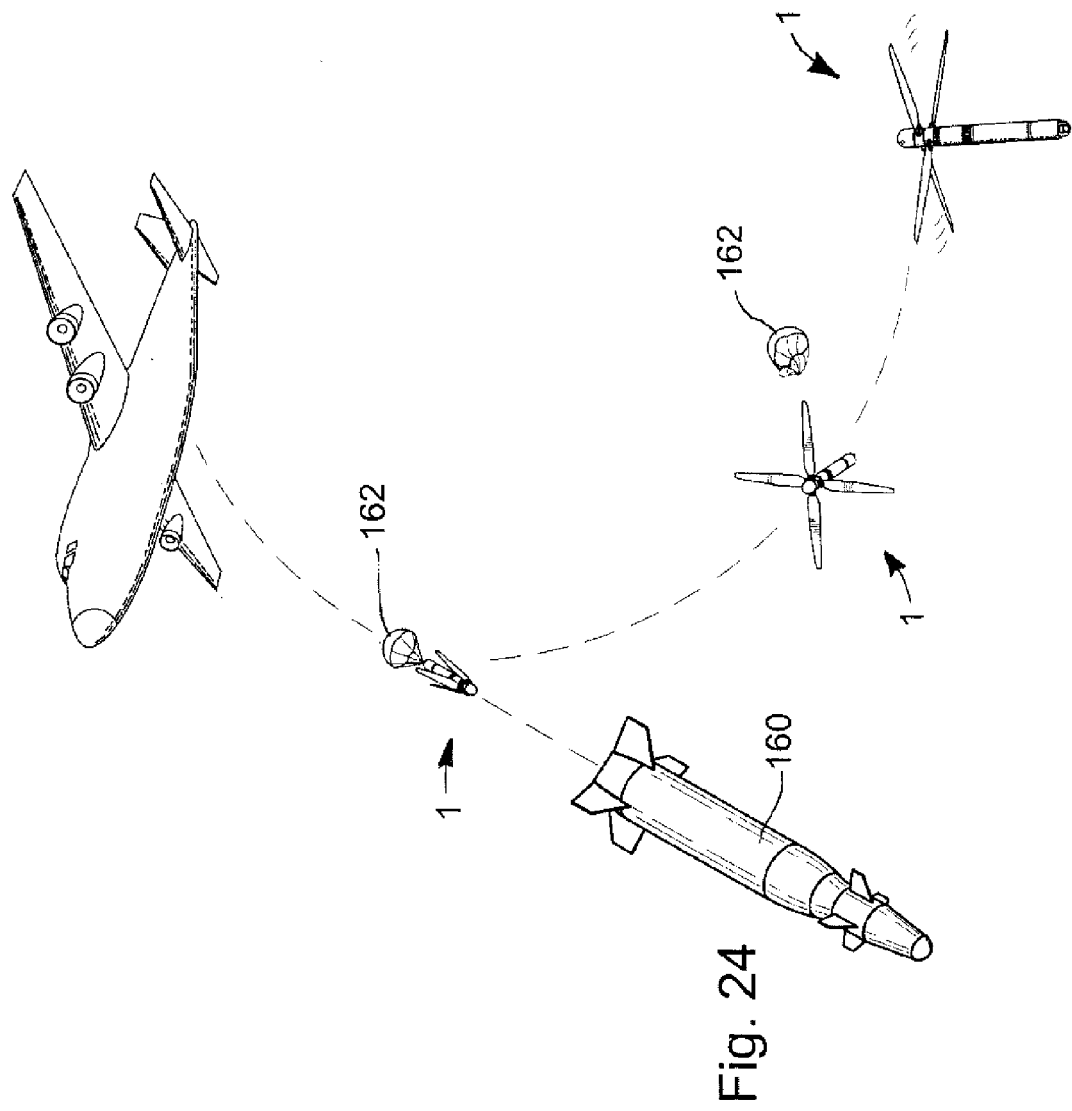
FIG. 24 is a perspective view of a rotary wing vehicle deploying from the rear of a gravity-delivered bomb to the vicinity of a target site showing the gravity-delivered bomb ejecting the rotary wing vehicle and the rotary wing vehicle deploying into a vertical flight mode to loiter in the target area to provide an attacking force with real-time battle damage assessment after the gravity delivered bomb has struck the target.

Another embodiment contemplated by this disclosure is adapted for use with a munition for assessing target damage done by the munition. As shown in FIG. 23, vehicle 1 is adapted for use with the munition, illustratively shown in the drawings as a gravity-delivered bomb 160. Bomb 160 is dropped from a launch platform such as an aircraft. In operation, gravity-delivered bomb 160 transports vehicle 1 to the vicinity of a target site whereupon vehicle 1 is released to fall away from bomb 160, illustratively slowed by use of an auxiliary drag chute 162, or ejected from bomb 160 by an explosive charge-actuated device, before bomb 160 reaches its target. Vehicle 1 then orbits or hovers in the target area near the impact site to observe bomb damage and transmits video and other information to a remote operator (not shown). This method of munition damage assessment is a feature of the disclosure which provides immediate battle damage assessments without requiring a launch platform to remain in the strike zone and reduces the need for subsequent strikes against the same target while minimizing risk to human crew members.

One feature of the disclosure is the non-rotating hollow core tube 40 or cruciform beam structural backbone that can, in some embodiments, double as a conduit for wiring and plumbing. A method or system of assembling mechanical and electrical components to the core or backbone is described to promote ease of assembly of a variety of UAVs from a kit of basic modules.

Another feature is that each of the rotors 20, 22 of the coaxial system of the current disclosure are driven by one or more separate electric motors, and the motors are positioned to lie on opposites sides of the rotors, with power transmission to and between the motors accomplished through electrical wiring (passing through the hollow core) instead of mechanical shafting, clutches, and gears. Compact rotor assemblies support the rotors for rotation without the need for traditional rotating coaxial shafting.

Still another feature is that a swashplate control system and one or more electric motors are provided for each rotor and are positioned to lie on opposite sides of each rotor thereby simplifying the mechanical and electrical connections needed to drive and control the rotors. Rotor modules are provided to quickly and easily assemble systems of rotors to the hollow core. Multiple rotor modules and swashplates are controlled by a single group of servos housed in a module.

An additional feature is that folding rotor blades 148, 149 are of unequal length. On the current disclosure with counter-rotating rotors 3, 5, folding blades 148, 149 of unequal length reduce the chance that the blades will contact one another as they fold at high speed during a crash-landing.

Another feature off the disclosure is a method of improving energy and power density on UAVs which can include a booster module 8 which is separable from the main vehicle in flight. A booster module 8 is provided to operate the UAV during a first flight phase. At the end of the first flight phase, the booster module falls away thereby reducing the weight of the UAV for continued operation in a second flight phase. On electric powered UAVs the power module can comprise a pack of batteries with or without an auxiliary lifting surface which is jettisoned in flight after the battery power is depleted, or payloads specific to a particular mission.

The invention claimed is:

1. A rotary wing aircraft comprising:
a non-rotating structural backbone,
a first rotor system coupled to the non-rotating structural backbone, the first rotor system including first rotor blades supported by a first rotor shaft for rotation about an axis of rotation, a first blade pitch controller coupled to the backbone, and a first motor fixed to the non-rotating structural backbone,
a second rotor system coupled to the non-rotating structural backbone, the second rotor system including second rotor blades supported by a second rotor shaft for rotation about the axis of rotation, a second blade pitch controller coupled to the non-rotating structural backbone, and a second motor fixed to the non-rotating structural backbone, and wherein the first rotor shaft and second rotor shaft are positioned to lie in axially spaced apart relation to one another along the axis of rotation;
wherein at least one of the first and second blade pitch controllers includes cyclic movement control of the rotor blades; and
wherein the first rotor blades are positioned to lie in spaced-apart relation to the second rotor blades and the first and second motors are positioned to lie in spaced-apart relation to one another to locate the first and second rotor blades therebetween.

2. The rotary wing aircraft of claim 1, further comprising a first module and a second module, wherein the first rotor system is positioned to lie in spaced-apart relation to the second rotor system and the first module and the second module are positioned to lie in spaced-apart relation to one another to locate the first and second rotor systems therebetween.

3. The rotary wing aircraft of claim 1, wherein the first pitch controller and the second pitch controller comprise swashplate means and servo means, and are positioned to lie adjacent to one another in spaced-apart relation between the first and second rotor blades.

4. The rotary wing aircraft of claim 1, further comprising a first module and a second module, wherein the first rotor system is positioned to lie in spaced-apart relation to the second rotor system and the first module and the second module are positioned to lie in spaced-apart relation to one another to locate the first and second rotor systems therebetween.

5. The rotary wing aircraft of claim 1, further comprising a power module coupled to the non-rotating structural backbone, wherein the first rotor blades are supported for rotation about the axis of rotation in a first rotor plane of rotation, one of the first motor and second motor are positioned to lie on a first side of the first rotor plane of rotation, the power module is positioned to lie on a second side of the first rotor plane of rotation, and energy from the power module is conducted by way of electrical components to one of the first motor and second motor through the non-rotating structural backbone.

6. The rotary wing aircraft of claim 1, wherein the first rotor system is positioned to lie in spaced-apart relation to the second rotor system and each motor is positioned to lie in spaced-apart relation to its associated rotor blades to locate their associated pitch controllers therebetween.

7. A rotary wing aircraft comprising:
a non-rotating structural backbone,
a first rotor system coupled to the non-rotating structural backbone, the first rotor system including first rotor blades supported for rotation in a first rotor plane about an axis of rotation and a first motor,
a second rotor system coupled to the non-rotating structural backbone, the second rotor system including second rotor blades supported for rotation in a second rotor plane about the axis of rotation and a second motor, and wherein the first motor is positioned to lie on an inflow side of the second rotor system and the second motor is positioned to lie on an outflow side of the first rotor system,
wherein at least one of the first rotor blades and the second rotor blades are variable pitch rotor blades controlled by a blade pitch controller which includes cyclic movement control of the rotor blades;
wherein the blade pitch controller is comprised of a first blade pitch controller and a second blade pitch controller;
wherein the first rotor blades are controlled by the first blade pitch controller, the second rotor blades are controlled by the second pitch controller, the first motor and first pitch controller are positioned to lie in spaced-apart relation to one another to locate the first rotor plane therebetween, and the second motor and second blade pitch controller are positioned to lie in spaced-apart relation to one another to locate the second rotor plane therebetween; and
wherein the first pitch controller and second pitch controller comprise swashplate means and servo means connected to the first and second rotor systems and are positioned to lie axially between the first and second rotor systems planes.

8. The rotary wing aircraft of claim 7, wherein the first pitch controller and second pitch controller share a common set of servo actuators and linkages.

9. The rotary wing aircraft of claim 7, wherein at least one of the first and second blade pitch controllers and at least one of the first and second motors is coupled to the non-rotating structure backbone between the first and second rotor planes, and wherein electric signals are conducted by way of electrical components through the non-rotating structural backbone across one of the first and second rotor planes to either the first pitch controller, the second pitch controller, the first motor or the second motor.

10. The rotary wing aircraft of claim 7, wherein at least one of the first and second rotors is coupled to the non-rotating structural backbone, and energy from a power module is conducted through the non-rotating structural backbone.

11. A rotary wing aircraft comprising
an airframe,
a first rotor system on the airframe, the first rotor system including first rotor blades supported for rotation in a first rotor plane about an axis of rotation and a first motor,
a second rotor system on the airframe, the second rotor system including second rotor blades supported for rotation in a second rotor plane about the axis of rotation and a second motor, and wherein the first motor is positioned to lie on an inflow side of the second rotor system and the second motor is positioned to lie on an outflow side of the first rotor system,
wherein the first rotor system includes variable pitch rotor blades controlled by a first pitch controller, the second rotor system includes variable pitch rotor blades controlled by a second pitch controller, the first motor and first pitch controller are positioned to lie in spaced-apart relation to one another to locate the first rotor plane of rotation therebetween, and the second motor and second pitch controller are positioned to lie in spaced-apart relation to one another to locate the second rotor plane of rotation therebetween,
wherein the first pitch controller and second pitch controller comprise swashplate means and servo means connected to the first and second rotor systems and are positioned to lie axially between the first and second rotor planes, and
wherein the first pitch controller and second pitch controller share a common set of servo actuators and linkages.

* * * * *